United States Patent
Kraus et al.

(10) Patent No.: US 12,490,927 B2
(45) Date of Patent: Dec. 9, 2025

(54) SYSTEMS AND METHODS FOR ANALYZING FREQUENCY-FOLLOWING RESPONSE TO EVALUATE CENTRAL NERVOUS SYSTEM FUNCTION

(71) Applicants: Northwestern University, Evanston, IL (US); Trustees of Dartmouth College, Hanover, NH (US)

(72) Inventors: Nina Kraus, Evanston, IL (US); Jay C. Buckey, Hanover, NH (US); Abigail M. Fellows, Hanover, NH (US); Jennifer L. Krizman, Glencoe, IL (US); Trent G. Nicol, Libertyville, IL (US); Catherine C. Rieke, Hanover, NH (US); Travis White-Schwoch, Evanston, IL (US)

(73) Assignees: Northwestern University, Evanston, IL (US); Trustees of Dartmouth College, Hanover, NH (US)

( * ) Notice: Subject to any disclaimer, the term of this patent is extended or adjusted under 35 U.S.C. 154(b) by 946 days.

(21) Appl. No.: 17/596,217

(22) PCT Filed: Jun. 8, 2020

(86) PCT No.: PCT/US2020/036604
§ 371 (c)(1),
(2) Date: Dec. 6, 2021

(87) PCT Pub. No.: WO2020/247913
PCT Pub. Date: Dec. 10, 2020

(65) Prior Publication Data
US 2022/0369997 A1    Nov. 24, 2022

Related U.S. Application Data

(60) Provisional application No. 62/858,798, filed on Jun. 7, 2019.

(51) Int. Cl.
*A61B 5/00* (2006.01)
*A61B 5/291* (2021.01)
(Continued)

(52) U.S. Cl.
CPC ............ *A61B 5/4058* (2013.01); *A61B 5/291* (2021.01); *A61B 5/374* (2021.01); *A61B 5/38* (2021.01); *A61B 2503/40* (2013.01)

(58) Field of Classification Search
CPC ....... A61B 5/38; A61B 5/374; A61B 2503/40; A61B 5/40; A61B 5/4058–407;
(Continued)

(56) References Cited

U.S. PATENT DOCUMENTS 8,014,853 B2    9/2011    Kraus et al.
8,712,514 B2    4/2014    Nicol et al.
(Continued)

OTHER PUBLICATIONS

Banai, K., et al. (2009) Reading and Subcortical Auditory Function, Cerebral Cortex, 19, 2699-2707.
(Continued)

*Primary Examiner* — Tse W Chen
*Assistant Examiner* — Evelyn Grace Park
(74) *Attorney, Agent, or Firm* — Quarles & Brady LLP

(57) ABSTRACT

Central nervous ("CNS") health in subjects who have human immunodeficiency virus ("HIV") or non-human-species analogs thereof is 102 evaluated or otherwise monitored by analyzing frequency following response ("FFR"). In general, one or more components of an FFR are analyzed, The FFR is measured in response to the administration of an acoustic stimulus to the subject. The acoustic stimulus includes a complex sound, which may include a consonant and a consonant-to-vowel transition. An indication of CNS health can be generated by measuring changes in the FFR components (e.g., over time or relative to normative data).

17 Claims, 6 Drawing Sheets

(51) Int. Cl.
*A61B 5/374* (2021.01)
*A61B 5/38* (2021.01)

(58) Field of Classification Search
CPC ............ A61B 5/279; A61B 5/291–293; A61B 5/369–384; A61B 5/00–7495
See application file for complete search history.

(56) References Cited

U.S. PATENT DOCUMENTS

| | | | |
|---|---|---|---|
| 8,825,140 | B2 | 9/2014 | Rice et al. |
| 2016/0217267 | A1 | 7/2016 | Kraus et al. |
| 2017/0332935 | A1 | 11/2017 | Kraus et al. |
| 2020/0237296 | A1* | 7/2020 | Schiff .................... A61B 5/378 |
| 2021/0233508 | A1* | 7/2021 | McLoughlin .... G10K 11/17861 |

OTHER PUBLICATIONS

Dhar, S., et al. (2009) Exploring the Relationship between Physiological Measures of Cochlear and Brainstem Function, Clin Neurophysiol, 120:5, 959-966.

Gray, Giles Wilkeson. (1942) Phonemic microtomy: The minimum duration of perceptible speech sounds, Communications Mongraphs, 9:1, 75-90.

Hornickel, J., et al. (2009) Subcortical Laterality of Speech Encoding, Audiol Neurootol, 14:3, 198-207.

Johnson, K., et al. (2007) Auditory Brainstem Correlates of Perceptual Timing Deficits, Journal of Cognitive Neuroscience, 19:3, 376-385.

Johnson, K., et al. (2008) Brainstem encoding of voiced consonant-vowel stop syllables, Clinical Neurophysiology, 119, 2623-2635.

Johnson, K. et al. (2008) Developmental Plasticity in the Human Auditory Brainstem, The Journal of Neuroscience, 28:15, 4000-4007.

Robinson, K. and Patterson, R. D. (1995) The Duration Required to Identify the Instrument, the Octave, or the Pitch Chroma of a Musical Note, Music Perception: An Interdisciplinary Journal, 13:1, 1-15.

Robinson, K. and Patterson, R. D. (1995) The stimulus duration required to identify vowels, their octave, and their pitch chroma, The Journal of the Acoustical Society of America, 98:4, 1858-1865.

Russo, N., et al. (2004) Brainstem responses to speech syllables, Clin. Neurophysiol, 115:9, 2021-2030.

Skoe, E. and Kraus, N. (2010) Auditory Brain Stem Response to Complex Sounds: A Tutorial, Ear and Hearing, 31:3, 302-324.

White-Schwoch, T., et al. (2015) Auditory-neurophysiological responses to speech during early childhood: Effects of background noise, Hear Res., 328, 34-47.

\* cited by examiner

SYSTEMS AND METHODS FOR ANALYZING FREQUENCY-FOLLOWING RESPONSE TO EVALUATE CENTRAL NERVOUS SYSTEM FUNCTION

CROSS-REFERENCE TO RELATED APPLICATIONS

This application represents the U.S. national stage entry of International Patent Application Serial No. PCT/US2020/036604, filed on Jun. 8, 2020, which claims the benefit of U.S. Provisional Patent Application Ser. No. 62/858,798, filed on Jun. 7, 2019, and entitled "SYSTEMS AND METHODS FOR ANALYZING FREQUENCY-FOLLOWING RESPONSE TO EVALUATE CENTRAL NERVOUS SYSTEM FUNCTION IN SUBJECTS WITH HUMAN IMMUNODEFICIENCY VIRUS OR NON-HUMAN-SPECIES ANALOGS THEREOF," each of which are herein incorporated by reference in its entirety.

STATEMENT REGARDING FEDERALLY SPONSORED RESEARCH

This invention was made with government support under DC009972 awarded by the National Institutes of Health. The government has certain rights in the invention.

BACKGROUND

Central nervous system dysfunction is associated with HIV infection even with effective anti-retroviral therapy ("ART"). Several hypotheses account for this dysfunction, including chronic inflammation, lingering damage from the acute infection stage, poor passage of ARTs through the blood-brain barrier, neurotoxic effects of ARTs, and oxidative stress from a cascade of immune system activation. While the prevalence and severity has declined with the adoption of combination ART, by some estimates up to 55% of HIV patients still develop HIV-associated neurocognitive disorders ("HAND").

Neuroimaging tests have shown structural, functional, and metabolic group differences between HIV+ and HIV− individuals, some of which are associated with cognitive function. Areas related to auditory processing are likely involved. Similarly, some studies have shown group differences in electrophysiological and magnetoencephalographic measures between HIV+ and HIV− individuals. These approaches can produce inconsistent results, are difficult to scale, and not always reliable in individual patients.

Measures of auditory function may offer a wider "window" into CNS health. Successful auditory processing relies on accurate and precise neural coding of fine-grained spectrotemporal cues, such as the features of speech that clue listeners into a sound's location and identity. Many populations with neurological declines or dysfunction exhibit difficulties with complex auditory tasks, including children with learning disabilities, individuals with a concussion, and the elderly.

While there are mixed reports of sensorineural hearing loss in HIV+ individuals (i.e. hair cell damage in the cochlea), converging evidence suggests that the auditory periphery is relatively healthy. Yet, HIV+ individuals report higher levels of difficulty understanding speech in noisy environments—a complex cognitive task that hinges on the integration of precise neural coding and cognitive abilities. There is some evidence that HIV+ individuals have difficulty making fine-grained temporal judgments, another complex auditory task. It has been suggested that cognitive dysfunction underlies these effects, and that auditory tests could offer simple and fast proxies to cognitive abilities.

The extent to which these auditory processing difficulties can be attributed to (i) HIV itself, (ii) treatment for HIV, and/or (iii) immune activation in the CNS remains debated. Regardless, auditory processing difficulties appear to be part of the HIV phenotype, supporting the idea that measures of auditory function could serve as proxies of CNS health in this population. The concept of auditory system dysfunction, even while receiving ART, fits with evidence of other sensorimotor dysfunctions documented in otherwise-healthy HIV+ individuals.

Despite innovations in treatment for HIV, patients still experience a number of neurological sequelae. The reasons for these ongoing consequences of HIV infection remain poorly understood, in part due to the paucity of methods available to evaluate CNS health in patients with HIV. Thus, there remains a need for reliable and objective measures of CNS health, particularly in patients with HIV.

SUMMARY OF THE DISCLOSURE

The present disclosure addresses the aforementioned drawbacks by providing a method for generating an indication of central nervous system (CNS) health in a subject who has an immunodeficiency virus, such as human immunodeficiency virus (HIV) or non-human-species analogs thereof. The method includes administering an acoustic stimulus to a subject. The acoustic stimulus includes a complex sound, which in some instances may include a consonant, a consonant-to-vowel transition, and optionally a vowel. In some implementations, the complex sound can also include background noise, which may include white noise. Brain response data are from the subject's brain while the acoustic stimulus is administered to the subject. The brain response data are acquired by measuring voltage potentials in the subject's brain using one or more electrodes. The brain response data are analyzed with a computer system to extract a frequency following response (FFR) associated with the acoustic stimulus. One or more components of the FFR are then determined using the computer system, and an indication of CNS health of the subject who has an immunodeficiency virus is generated based on the one or more components of the FFR.

The foregoing and other aspects and advantages of the present disclosure will appear from the following description. In the description, reference is made to the accompanying drawings that form a part hereof, and in which there is shown by way of illustration a preferred embodiment. This embodiment does not necessarily represent the full scope of the invention, however, and reference is therefore made to the claims and herein for interpreting the scope of the invention.

DETAILED DESCRIPTION

Figure 1:
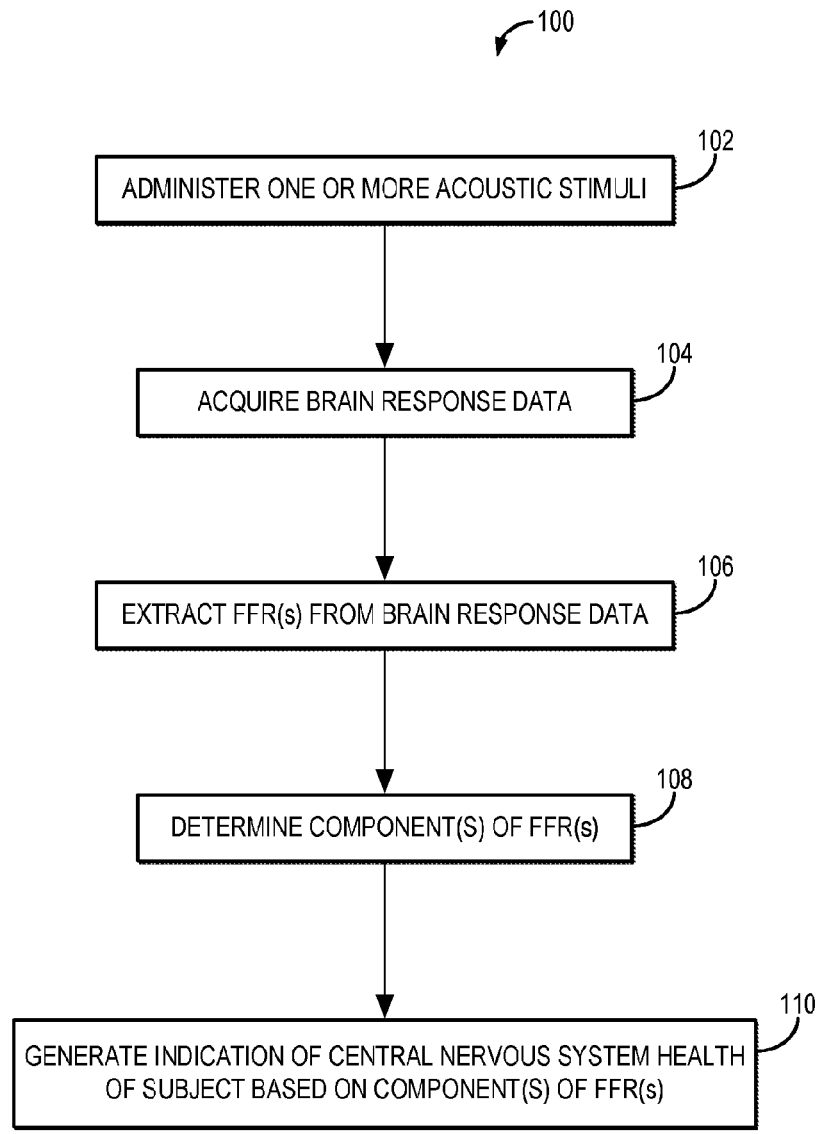
FIG. 1 is a flowchart setting forth the steps of an example method for analyzing a frequency following response ("FFR") to generate an indication of CNS health or function in a subject with an immunodeficiency virus.

Described here are systems and methods for evaluating and/or monitoring central nervous ("CNS") health in subjects who have an immunodeficiency virus, such as human immunodeficiency virus ("HIV") or non-human-species analogs thereof, such as simian immunodeficiency virus, feline immunodeficiency virus, or other animal models of HIV. In general, CNS health of a subject with HIV or other immunodeficiency virus can be evaluated and/or monitored by analyzing one or more components of a frequency-following response ("FFR") that is measured in response to the administration of an acoustic stimulus to the subject. The FFR is an electrophysiological evoked potential that measures the integrity of sound processing, and which reflects sustained neural activity over a population of neural elements.

The systems and methods described in the present disclosure provide a series of steps to evaluate CNS function in subjects with HIV or other immunodeficiency virus, and to qualitatively and quantitatively describe CNS health in these subjects. The disclosed systems and methods may be applied in clinical and research contexts in humans and animal subjects.

As one non-limiting example, the present disclosure provides systems and methods for identifying or characterizing CNS dysfunction in subjects with HIV or other immunodeficiency virus, whether asymptomatic or symptomatic. For instance, the systems and methods described in the present disclosure can be implemented in a protocol and/or workflow to test for disruptions to the CNS health of subjects with HIV. In this way, diagnostic information can be provided.

Additionally or alternatively, the systems and methods can be used assess a subject's progression of CNS dysfunction over time, or to monitor a subject's response to a treatment. For instance, the efficacy of a treatment or other intervention (e.g., a pharmacological treatment) on CNS health in subjects with HIV, in animal models of HIV, or both, can be monitored. In this way, the systems and methods are capable of providing prognostic information, such as information about the efficacy of a particular treatment plan or drug regimen.

Also disclosed herein are processes and systems for automatically generating acoustic stimuli and processing brain response data to identify CNS dysfunction or to otherwise monitor CNS health in subjects with HIV or other immunodeficiency virus.

The disclosed systems and methods are portable and, in some examples, can be used in resource-limited settings where the majority of new HIV cases are diagnosed. Current approaches, such as MRI or CT imaging, are extremely expensive and not portable.

The disclosed systems and methods are objective, meaning they do not require a subject's response or compliance with the test. Current approaches, such as "paper-and-pencil" neuropsychological testing, are subjective in that a subject can influence test outcomes. These approaches can also be biased by the test administrator and factors such as patient exhaustion.

While the enclosed example is on human subjects, disclosed methods and systems can be used in animal models. This is important because it can facilitate research in animal models (e.g., testing new drug regimens) that can in the future be translated to human subjects. Suitable subjects can therefore include a human, a livestock animal, a companion animal, a laboratory animal, and a zoological animal. As one non-limiting example, the subject is a human subject. As another non-limiting example, the subject can be a non-human simian subject. As still another non-limiting example, the subject can be a feline subject. The methods described in the present disclosure may not be suitable for subjects with deafness or known neurological conditions that may have an impact on FFR (e.g. multiple sclerosis, epilepsy).

It is contemplated that the auditory processing difficulties present in subject with HIV are grounded in the CNS. The speech-evoked FFR is an objective, non-invasive electrophysiological measure of auditory processing. In this test, complex syllables such /ba/, /ga/, or /da/ can be played into the ear and electrophysiological responses can be measured with surface electrodes (e.g., those similar to an electroencephalogram). This electrophysiological response reflects the CNS's ability to process sound. Uniquely, the FFR is not affected by a subject's ability to learn or attend to a task, meaning it is an objective measure of CNS health. Different clinical populations exhibit distinct FFR profiles, and it is a sensitive and specific marker of both concussions and reading disabilities.

Figure 2:
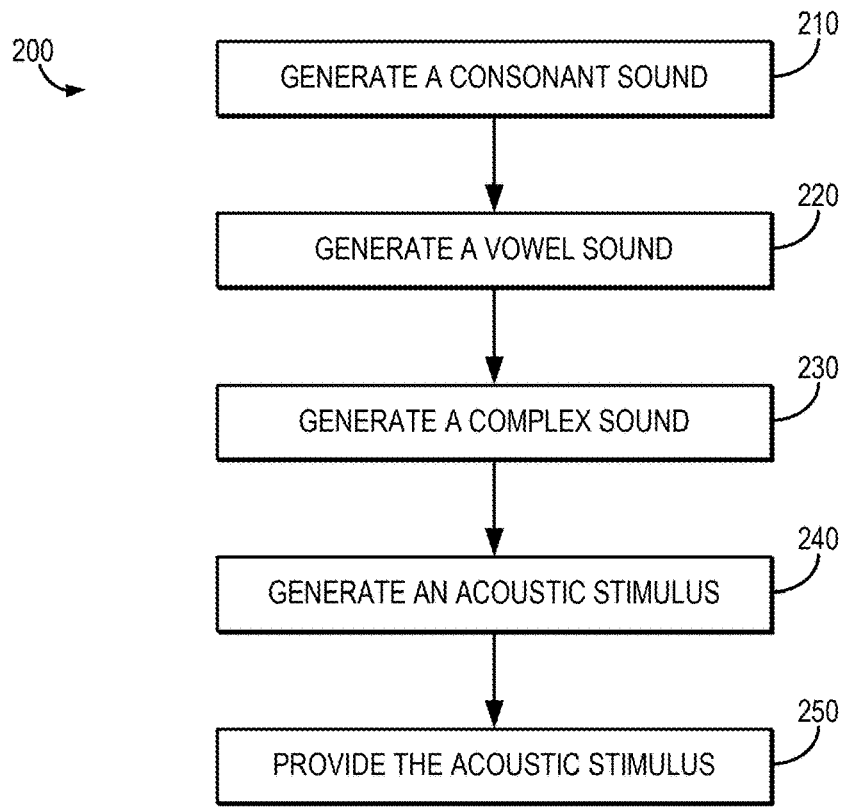
FIG. 2 is a flowchart setting forth the steps of an example method for generating and applying an acoustic stimulus.
Figure 3:
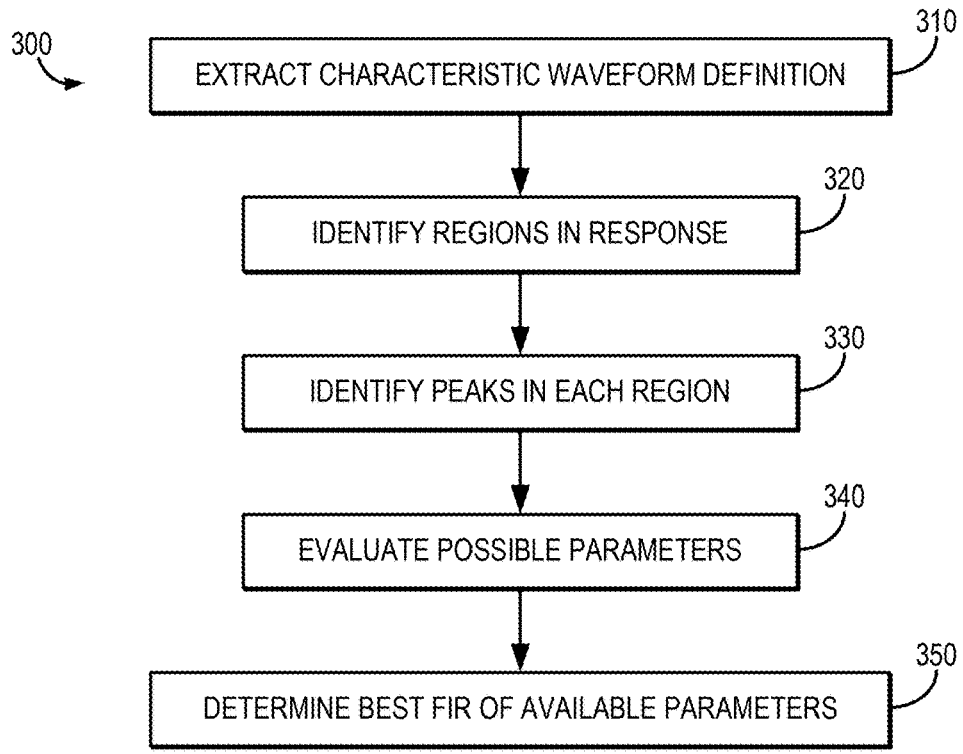
FIG. 3 is a flowchart setting forth the steps of an example method for analyzing brain response data that are measured in response to an applied acoustic stimulus.

An illustrative process and system for automatically generating acoustic stimuli and processing brain response data to generate an indication of CNS health in a subject with HIV is depicted in FIGS. 1-3. In particular, FIG. 1 illustrates an example process 100 for generating an indication of CNS health in a subject with HIV, or other immunodeficiency virus, by delivering an acoustic stimulus, measuring a brain response, and processing the measured brain response. FIG. 2 illustrates an example process 200 for generating acoustic stimuli, and FIG. 3 illustrates an example process 300 for processing brain response data to generate an indication of CNS health.

As described above, the disclosed systems and methods generally include administering an acoustic stimulus to a subject in order to evoke a brain response, which is then analyzed to qualify and/or quantify the CNS health of the subject. A brain response to sound can be evoked by presenting an acoustic stimulus that includes a complex sound to a subject. The brain's response to the acoustic stimulus can be recorded in a number of different ways. As one non-limiting example, the brain's response can be measured using electrodes that pick up electrical potentials (e.g., voltage potentials) generated by populations of neurons in the brain.

In general, an acoustic stimulus is an input of one or more sounds, and may include a complex sound. As an example, a complex sound is a sound that is composed of two or more frequencies. An acoustic stimulus may be presented once or multiple times. Each presentation of the same acoustic stimulus may be refer to as a "trial."

In embodiments where an acoustic stimulus is presented multiple times, the temporal interval between the offset of one stimulus to the onset of another can vary such that there is no amount of time between the stimuli, or such that various amounts of time are included. This interval can be referred to as the interstimulus interval. A non-limiting example of a range for an interstimulus interval may be 0 ms to about 80 ms. Considerations for choosing an appropriate interstimulus interval are known in the art. See, for example, Skoe et al., *Ear & Hearing,* 2010, 31(3) and the references disclosed therein.

Referring now to FIG. 1, a flowchart is illustrated as setting forth the steps of an example method for generating an indication of the CNS health of a subject with HIV or other immunodeficiency virus, such as simian immunodeficiency virus, feline immunodeficiency virus, or other non-human-species analogs of HIV, which may include other animal models of HIV.

The method includes administering an acoustic stimulus (or multiple acoustic stimuli) to the subject, as indicated at step 102. As described, an acoustic stimulus generally includes a complex sound, which may be a speech sound. A speech sound may include a consonant sound, a vowel sound, and a consonant-to-vowel transition. As one non-limiting example, the acoustic stimuli can include the complex speech sounds /da/, /ba/, and /ga/. Each of these example complex sounds begins with a consonant-to-vowel transition region, during which formants—high-frequency acoustic cues that convey phonetic identity—change. The /da/ can include a 40 ms consonant-to-vowel transition region only. In these instances, the /da/ is phonetically a /d/, but is still perceived as "da." The /ba/ and /ga/ can begin with a 50 ms transition region and then have a 120 ms acoustically stable vowel portion. Examples of other complex sounds and acoustic stimuli that can be used are described later in the present disclosure. As an example, acoustic stimuli can be administered by presenting them to one or both of the subject's ear. For instance, the acoustic stimuli can be presented to the right ear through electrically shielded insert earphones at 80 dB SPL in alternating polarities at rates of 10.9 Hz (/da/) and 4.35 Hz (/ba/ and /ga/).

Brain response data are then acquired from the subject in response to the administered acoustic stimulus (or multiple acoustic stimuli), as indicated at step 104. The brain response data can be acquired by measuring voltage potentials from the subject's brain. As one non-limiting example, speech-evoked FFRs can be collected using one or more electrodes, such as those used in a SmartEP system (Intelligent Hearing Systems, Miami, FL). For instance, brain response data can be recorded with three Ag—AgCl electrodes at Fpz (active), A2 (reference), and Fz (ground).

The brain response data are then processed to extract or otherwise determine FFR data corresponding to one or more FFRs, as indicated at step 106. For instance, the brain response data can be digitized, filtered, and/or epoched. As one example, brain response data can be digitized at 40 kHz (e.g., for brain response to /da/) or 13.333 kHz (e.g., for brain response to /ba/ and /ga/). Additionally or alternatively, the brain response data can be filtered online, such as from 0.05-3 kHz (with a 50 Hz notch filter). Additionally or alternatively, the brain response data can be epoched, such as from −20-55 ms re-stimulus onset (/da/) and −40-190 ms re-stimulus onset (/ba/ and /ga/). In some instances, a plurality of runs or trials can be performed and the brain response data can contain measurements for each of these. As a non-limiting example, the brain response data can contain measurements corresponding to two runs of 3,000 artifact-free responses to each acoustic stimulus. In this example, after collection responses can be filtered either from 0.1-1.5 kHz (/da/) or 0.7-2 kHz (/ba/ and /ga/). The two runs can then be averaged to generate final FFRs corresponding to 6,000 artifact-free trials.

The FFR data are then processed in order to extract or otherwise determine components or parameters of the FFR, as indicated at step 108. Examples of components of an FFR can include components of a brain response fundamental frequency, components of a first formant, and/or components of other harmonics. Components of a brain response fundamental frequency, first formant, or other harmonic, may include amplitude, frequency error, sharpness, phase consistency, and/or pitch tracking. Other example components may include neural timing, response amplitude, stimulus-response correlation, response consistency, and/or difference measures. Methods for computing or otherwise determining these and other components are described below in detail.

The FFR components are analyzed to generate an indication of CNS health in the subject, as indicated at step 110. As one non-limiting example, analyzing the FFR components includes measuring changes in the FFR components. These changes may be measured over time for the same subject (e.g., by comparing FFR components to previously measured FFR components from the same subject), or relative to normative data (e.g., by comparing FFR components to similar components contained in normative data). As described, normative may include data from a healthy control subject, a healthy control population, a population average from a healthy control group, and so on.

The indication that is generated may include a report. The report can include qualitative information about the subject's CNS health, quantitative information about the subject's CNS health, or combinations thereof. In some instances, the report can include textual information, numerical information, or both. Additionally or alternatively, the report may include a display element that indicates the CNS health of the subject, where the display element is generated and displayed on a user interface.

Referring now to FIG. 2, as stated above, FIG. 2 illustrates a process 200 for generating and applying an acoustic stimulus to a subject. The acoustic stimulus can include any of a variety of real and/or synthetic sounds, including a frequency sweep over time against a background (e.g., a sound including one or more transitions based on rapid changes in frequency over a period of time, a sound including a formant transition built with complementary background noise). One example of an acoustic stimulus is a consonant-vowel combination against background noise.

At block 210, a consonant sound of a first duration is generated. For example, a /d/, /g/, /c/, etc., is selected as the consonant sound to form part of the acoustic stimulus to elicit a response from the subject.

At block 220, a vowel sound of a second duration is generated. In certain examples, the second duration is longer than the first duration. That is, the vowel sound is played longer in the acoustic stimulus than the consonant sound. For example, an /a/, /i/, /o/, /u/, etc., is selected as the vowel sound to accompany the /d/, /g/, /c/, etc., selected as the consonant sound to form part of the acoustic stimulus to elicit a response from the subject.

At block 230, a complex sound (e.g., a speech sound) is generated by combining the consonant sound and the vowel sound. For example, the consonant sound and vowel sound are combined by placing the vowel sound after the consonant sound to form the complex sound to be provided in the acoustic stimulus. In other examples, the consonant sound follows the vowel sound to form the complex sound.

At block 240, the acoustic stimulus is generated using the complex sound. In some instances, the acoustic stimulus is generated by mixing a background noise with the complex sound to generate the acoustic stimulus. For example, the background noise can include a plurality of voices talking at the same time and/or approximately the same time to create a human background noise over which the stimulus can be played. In certain examples, the background noise is of a third duration that is longer than the second duration (and, therefore, also longer than the first duration).

At block 250, the acoustic stimulus is provided for output with respect to the subject. For example, the acoustic stimulus can be output as a six-formant stop consonant constructed in a synthesizer, such as a Klatt-based synthesizer at 20 kHz, etc. In certain examples, following an initial stop burst, a consonant transition (e.g., 50 ms from /d/ to /a/, etc.) during which lower formants (e.g., the lower three formants) shift in frequency (e.g., $F_1$ 400-720 Hz, $F_2$ 1700-1240 Hz, $F_3$ 2580-2500 Hz, etc.). In these examples, the lower three formants are steady for the subsequent vowel (e.g., 120 ms at /a/), and the fundamental frequency and upper three formants are steady through the stimulus (e.g., $F_0$ 100 Hz, $F_4$ 3300 Hz, $F_5$ 3750 Hz, $F_6$ 4900 Hz, etc.).

As noted, in some examples the acoustic stimulus is presented against a noise or "babble" track (e.g., six voices speaking semantically anomalous English sentences at a +10 SNR, etc.). In certain examples, the babble track loops continuously since there is no phase synchrony between the onsets of the speech sound and the noise. In certain examples, the acoustic stimulus formed from the complex sound and noise is mixed into a single channel that is presented to a single ear of the subject (e.g., the right ear of the subject at 80 dB of sound pressure level ("SPL") in alternating polarities through electromagnetically-shielded insert earphones, etc.). In certain examples, the acoustic stimulus presentation can be controlled with a defined interstimulus interval (e.g., 61 ms, 81 ms, etc.) in a plurality of sweeps (e.g., 4200 sweeps, 6300 sweeps, etc.).

While the process 200 described above describes a specific complex sound that contains a consonant-to-vowel transition, it is contemplated that other complex sounds may be used, such as the complex sounds described above.

Referring now to FIG. 3, a process 300 for analyzing a response to an acoustic stimulus from one or more subjects is provided. At block 310, a characteristic waveform definition is extracted from the received response. For example, a time-locked average of one or more subject responses (e.g., inter-response and intra-response averaging) is computed to amplify common features and reduce noise to increase signal-to-noise ratio ("SNR") of the characteristic waveform.

At block 320, the characteristic waveform of the response is processed to identify distinct regions within the response. For example, a consonant-vowel complex sound includes three regions: a consonant sound region, a transition region between the consonant and the vowel (i.e., a consonant-to-vowel transition), and a vowel sound region. These regions may be the same length and/or may be of varying lengths with respect to each other. For example, the vowel sound region may be of longer duration than the consonant sound region, and the transition region may be shorter than the consonant sound region.

The vowel sound region can be readily identified by analyzing an end of the response to identify a series of evenly spaced peaks that are the brain's response to the fundamental frequency of the vowel sound. Using peak finding techniques such as a windowed, filtered, maxima and/or minima, etc., peaks can be identified and compared for consistency of temporal spacing. Additionally, this technique can be informed by a-priori knowledge about the fundamental frequency of a sound so that an expected spacing between the peaks is known. The vowel sound region can be defined as the temporal region between the first occurring peak in this train of peaks and the end of the response.

The consonant sound region (e.g., a region of the first onset peak for the stimulus) can be identified using similar peak finding techniques as those used to find the vowel sound region. The consonant sound region is defined as a region between the first large peak, known as the onset peak, in the characteristic waveform, and the next peak that exceeds the onset peak's amplitude. The location of both peaks can be further informed by the a-priori knowledge of the stimulus timing and experiential knowledge of a brain's latency in response to onset of sound stimuli.

Once the consonant and vowel sound regions have been defined, the transition region can be defined as the response in the temporal period between the end of the consonant sound region and the beginning of the vowel sound region. Peaks within this transition region can also be identified using similar peak finding techniques (e.g., a windowed peak-picking algorithm) used in identifying peaks in the consonant and vowel sound regions.

At block 330, one or more peaks are identified within the determined regions of the response. For example, peaks can be identified within a vowel sound region. Using information about the temporal location of peaks within the vowel sound region from a characteristic response as a template, peak searching can be seeded within the same region on individual responses to the same stimulus. By allowing the peak search to shift slightly within a range relative to the expected location, individual differences in temporal latency from the characteristic response can be captured and used for subsequent analysis. Similarly, individual differences in peak location with the transition region may be captured and used for subsequent analysis.

At block 340, parameters are evaluated based on the regions and determined peak information. For example, by analyzing the response to identify various aspects of the response (e.g., regions of the response, peaks within each region, etc.), parameters (e.g., FFR parameters) can be evaluated to build a model for generating an indication of CNS health. In certain examples, parameters can be added and/or removed and tested with respect to the developing model. If the parameter improves the model fit, the parameter can be associated with the model. If, however, the parameter worsens or otherwise fails to improve the model fit, the parameter is not associated with the model.

In certain examples, one or more databases and/or other data stores include data and results from testing of different FFR parameters on different demographics. Databases and/or data stores can also include industry-standard behavioral test results obtained from subjects of various ages for comparison in building and evaluating a model.

At block 350, a best fit of available parameters is determined for a desired model. For example, in determining a best fit, there are many processes by which a combination of independent variables (or features) can be derived so that combination best predicts a set of dependent variables (outcome measures) across a population of individuals. One such method is regression (e.g., general linear models such as hierarchical regression, logistic regression, ordinary least squares regression, etc.), but other methods include neural networks, support vector machines, or other machine learning algorithms, which may implement supervised learning or unsupervised learning; latent variable modeling, genetic expression programming, etc. A combination of those independent variables that best predict the values of the outcome measures can be considered a predictive model of those outcome measures for a population (e.g., for individuals in that population), given a population that is appropriately large for the chosen statistical approach.

In certain examples, combinations of independent variables can be linear combinations and/or non-linear combinations. Additionally, as discussed above, some variables may provide no substantive contribution to the model and may be discarded to simplify the model's complexity. One process, known as LASSO (Least Absolute Shrinkage and Selection Operator) analysis is a regression analysis method that performs variable selection and regularization to generate a desired model at varying degrees of complexity (e.g., with more/less independent variables contributing).

Resulting selected parameters can be calculated and used to generate the desired model, for example. While the process 300 described above describes a specific a complex sound that contains a consonant-to-vowel transition, it is contemplated that other complex sounds may be used, such as the complex sounds described above.

In an example study, the methods described in the present disclosure were implemented in a cohort of 68 HIV+ and 59 HIV− subjects. The mean age was 35.2 yr (SD, 10.6 yr; range: 18.1-52.9 yr). The HIV+ and HIV− groups had a similar distribution of males and females ($\chi 2=1.82$, $p=0.176$). The HIV+ group was about 6 years older than the HIV− group ($t(125)=3.24$, $p=0.002$) and so all analyses co-varied for age. The groups had similar pure-tone-average hearing thresholds in the right and left ears (both controlling for age, main effect: $F(1,124)=0.42$, $p=0.515$, and not controlling for age, main effect: $F(1,125)=1.49$, $p=0.23$). Middle- and inner-ear health were further evaluated by tympanograms and otoacoustic emissions.

Figure 4:
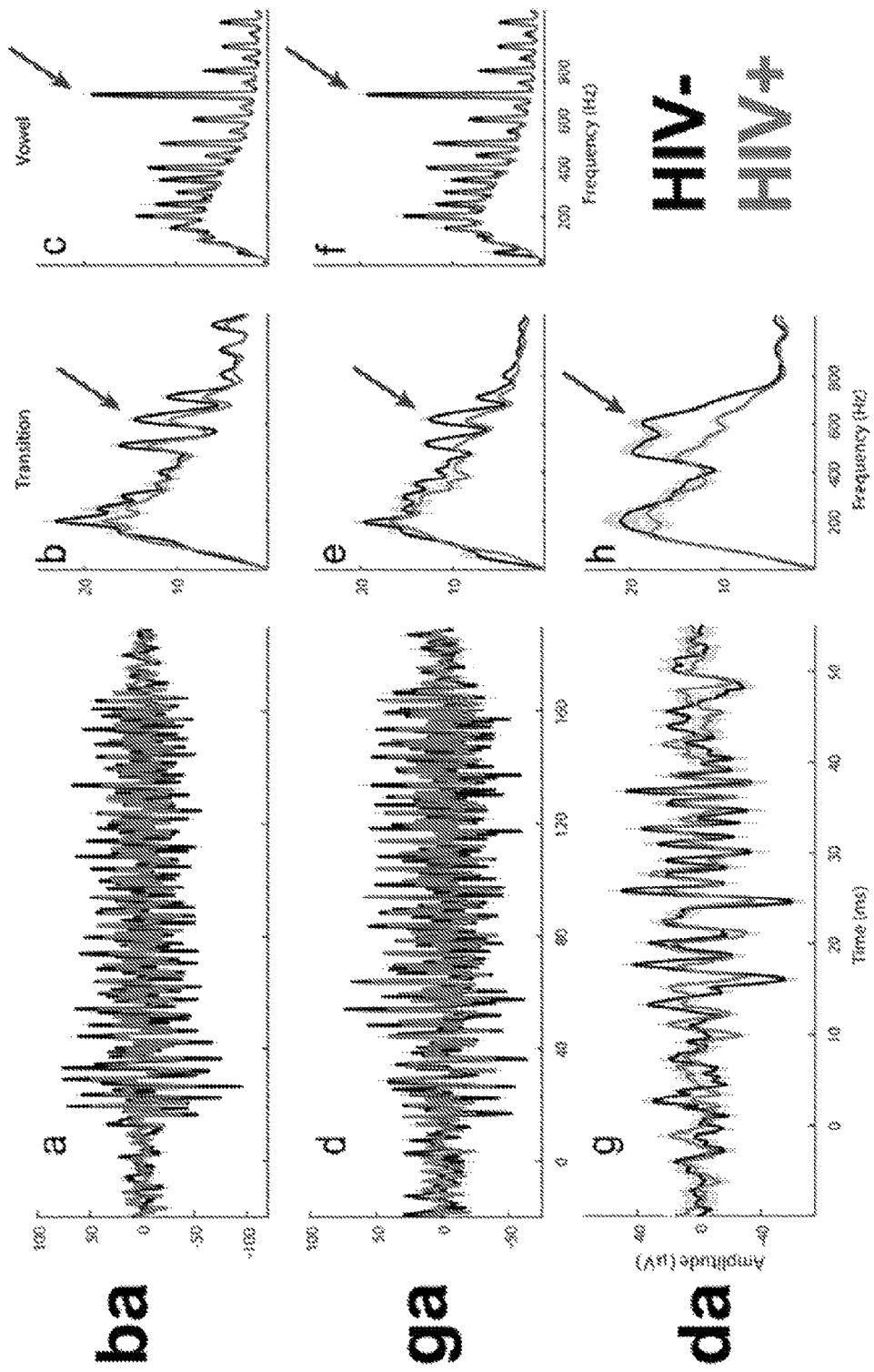
FIG. 4 shows FFRs for HIV+ (red) and HIV− (black) groups. Illustrated are averaged responses to /ba/ (top row), /ga/ (middle row), and /da/ (bottom row). Responses are shown in the time domain (a, d, g) and frequency domain. Spectra were calculated over the transition region (b, e, h) and vowel region (c and f; the da stimulus only contains the transition region). Arrows point to the F1 component of each response. Shaded regions indicate ±1 SEM.
Figure 5:
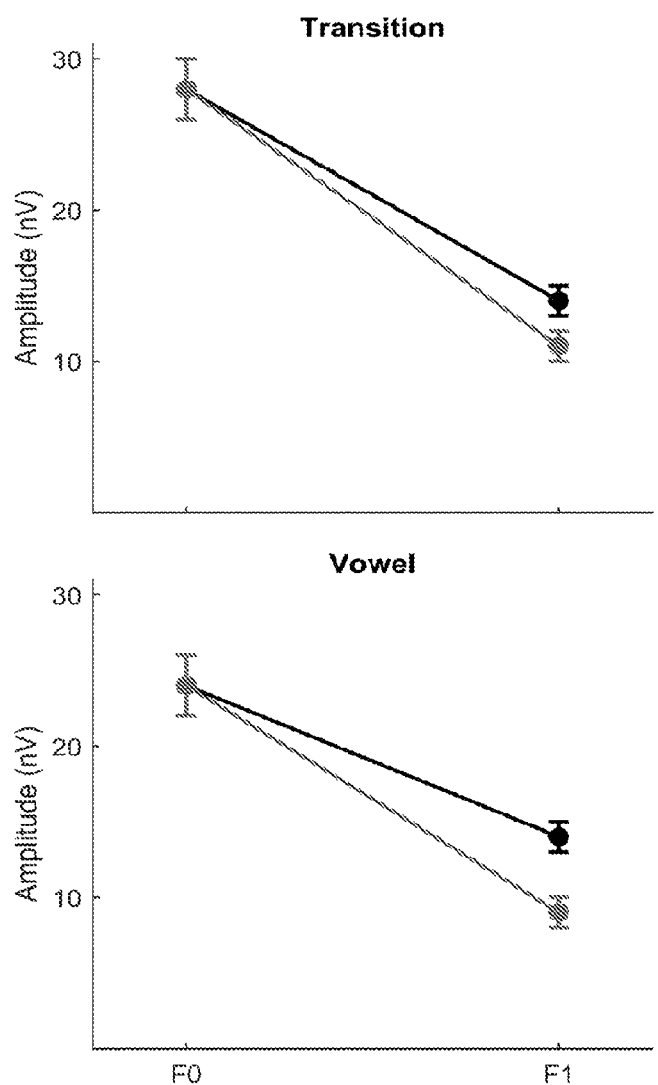
FIG. 5 shows mean F0 and F1 amplitudes for the transition (top) and vowel (bottom) regions. Groups have matched responses to the F0, whereas the HIV+ group has diminished responses to the F1.

FFRs were quantified to the fundamental frequency (F0) and first formant (F1) of each speech sound—chief acoustic cues that convey the sound's pitch and phonetic identity, respectively (see FIG. 4 for each groups' average FFR for each stimulus). The stimuli could be divided into two time regions: (i) the "transition" region, which reflects the initial onset of the speech sound and the dynamic spectrotemporal shift from the consonant to the vowel, and (ii) the vowel region, which is spectrotemporally static. There was an acoustic cue (F0 vs. F1) x group (HIV− vs. HIV+) interaction for the transition region ($F(1,120)=4.864$, $p=0.029$, $\eta 2=0.039$; FIG. 5A) but not the vowel region ($F(1,124)=2.158$, $p=0.144$, $\eta 2=0.017$; FIG. 5B).

Main effects of the HIV+ group on the F1 and F0 responses were investigated. F1 responses were smaller in the HIV+ group over the transition region of all stimuli (/da/, /ba/, and /ga/; main effect of group, $F(1,120)=13.0642$, $p<0.001$, $d=0.67$). Averaged across all stimuli, the HIV+ had responses 2.99 nV smaller than the HIV− group (95% CI: 1.80, 4.17). The magnitude of the difference was similar across all stimuli (no group x stimuli interaction, $F(2,119)=0.75$, $p=0.48$). For F0 responses, there was neither a group main effect ($F(1,120)=1.96$, $p=0.16$) nor a group x stimulus interaction ($F(2,119)=1.01$, $p=0.37$).

The HIV+ group's F1 responses were also smaller over the vowel regions for the two stimuli with a static vowel (/ba/ and /ga/; main effect of group, $F(1,124)=10.81$, $p=0.001$, $d=0.59$). Averaged across both stimuli, the HIV+ group had responses 6.10 nV smaller than the HIV− group (95% CI: 3.34, 8.85). The magnitude of this difference was also similar across stimuli (no group x stimuli interaction, $F(1,124)=0.67$, $p=0.41$). For F0 responses, there was neither a group main effect ($F(1,124)=0.05$, $p=0.82$) nor a group x stimulus interaction ($F(1,124)=0.25$, $p=0.62$).

The group F1 differences could not be attributed to the levels of noise (e.g., electrical noise) in the FFRs. Noise was quantified by calculating the magnitude of the pre-stimulus period of each response. The HIV+ and HIV− groups were matched with respect to noise levels for all stimuli (/da/, /ba/, and /ga/: no main effect of group $F(1,120)=0.45$, $p=0.50$; no group x stimuli interaction, $F(2,119)=1.46$, $p=0.238$). Thus, the HIV+ group's reduced coding of the F1 in speech appeared to be a selective dysfunction.

An acoustic stimulus includes a complex sound and, optionally, background noise. Background noise may refer to any sound that occurs at the same time as the sound of interest (e.g., the complex sound intentionally administered to a subject to elicit an auditory response). Non-limiting examples of background noise include white noise, pink noise, a murmur of voices, sound(s) associated with traffic, sounds associated with construction, and so on.

A complex sound is a sound composed of two or more frequencies. The complex sound can include amplitude, frequency, or phase modulated waves. An amplitude modulated wave is when the amplitude of a carrier wave, such as a sine wave, is altered by a modulating wave. For example, a 1000 Hz sine wave carrier could be modulated by a 300 Hz sine wave tone. These waves do not have to be tones. Similarly, a wave can also be modulated in frequency or phase. Thus, the term "complex sound" generally excludes simple sounds known in the art including, but not limited to, clicks and sinusoidal tones that are not modified. A complex sound may be natural, synthetic, or a hybrid. Minimally, a complex sound used in the methods of this disclosure should elicit a clear and reproducible brain response in healthy subjects. Synthetic or hybrid sounds are preferred because they offer precise control over the various aspects of sound, but well-characterized audio files of natural sounds are suitable as well.

Non-limiting examples of complex sounds include vocal sounds, environmental sounds, and musical sounds. Vocal sounds can include, but are not limited to, a speech syllable, a word, and a non-speech vocal sound (e.g., a cry, a grunt, an animal sound, etc.). Musical sounds can include, but are not limited to a note played by an instrument, a consonant two-note interval played by an instrument, a dissonant two-note interval played by an instrument, and a musical chord. Environmental sounds can include, but are not limited to a rainfall sound, an ocean sound, a car horn, a train whistle, etc.

Complex sounds used in the present disclosure can have aspects that maximize transient and sustained brain responses. In one aspect, a complex sound can have one or more strong transient features. Transient features are brief and nonsustained, and evoke fast response peaks lasting fractions of milliseconds (i.e., a transient brain response). The relative strength of a transient feature refers to the timing and/or amplitude. The onset of sound and the offset of sound are common transient features of complex sound.

The onset of sound is also referred to as "attack," which is the amount of time taken for the amplitude to reach its maximum level. The offset of sound is also referred to as "release," which is the final reduction in amplitude over time. A transient feature may also be an "amplitude burst," which is an abrupt change in the amplitude envelope of a complex sound. For example, a baby's cry can include multiple amplitude-bursts that produce a series of sharp, transient responses.

For a given group of complex sounds, the strength of a transient feature can be determined by one of skill in the art through routine experimentation, or may be known in the art. For example, among speech sounds, obstruent stop consonants (e.g., /d/, /p/, /k/, /t/, /b/, /g/, etc.) have faster and steeper onsets than affricate consonants (e.g., /ʧ/ and /ʤ/, etc.), which have faster and steeper onsets than fricative consonants (e.g., /z/, etc.), which have faster and steeper onsets than sonorant consonants (e.g. nasals, glides, and slides (e.g., /r/, /l/, etc.)). Similarly, musical sounds have varying attack properties that depend on the instrument and how the instrument is played. For example, percussive instruments have fast, steep attacks, and bowed string instruments have comparatively smoother attacks; and a plucked string has a shorter rise time than a bowed string.

In another aspect, a complex sound can have a fundamental frequency ($F_0$) in the range of about 50 Hz to about 500 Hz. Fundamental frequencies within this range elicit a strong (i.e., sustained), phase-locked brain response to the fundamental frequency and its harmonics. Because phase-locking may become weaker with increasing frequency, a $F_0$ range of about 50 Hz to about 400 Hz may be preferred. Alternatively, the $F_0$ range may be a range about 80 Hz to about 400 Hz, or about 80 Hz to about 300 Hz. In some embodiments, a complex sound may have a fundamental frequency that is stable. In some embodiments, a complex sound may have a fundamental frequency that changes. In other embodiments, the stimulus may be manipulated to remove the fundamental frequency and only contain the harmonic integer frequencies of the fundamental frequency. In these instances, a listener still perceives a fundamental frequency that is approximated as the common denominator from the harmonics. For example, a harmonic series at 200, 300, 400, and 500 Hz would result in a perceived $F_0$ at 100 Hz, and there would be a brain response at 100 Hz.

In embodiments where the complex sound is a speech sound, voiced portion(s) of the sound can provide the sustained features. Many, but not all, consonant sounds are unvoiced, meaning that the vocal cords are not in motion. In most languages all vowels are voiced, meaning that the vocal cords are in motion. Thus, a "consonant-to-vowel transition" often involves a change, acoustically, from an unvoiced speech segment to a voiced speech segment. Non-limiting examples of a voiced portion of a sound include a consonant-to-vowel transition, a voiced consonant transition, or a steady-state vowel portion. Though non-speech vocal sounds from animals do not include consonants and vowel, they do contain voiced sounds (for those animals with vocal cords) and other sounds filtered by the vocal tract. As such, non-speech vocal sounds contain acoustic features that are substantially similar to a consonant-to-vowel transition in a speech sound.

The duration of a complex sound can vary. In general, the minimum duration of the complex sound should be at least one cycle of the complex sound's fundamental frequency. For example, the duration may be 1, 2, 3, 4, 5, 6, 7, 8, 9, 10, or more cycles of the complex sound's fundamental frequency. A skilled artisan can determine an appropriate number of cycles by routine experimentation, or based on teachings in the art. For example, musical timbre and vowel identity can be accurately determined from one to four cycles of the fundamental frequency, but pitch identification may require about four or more cycles. See, for example, Gray, G. W. (1942), *Speech Monographs*, 9, 75; or Robinson, K. (1995), *Music Perception*, 13, 1-15; or Robinson, K., & Patterson, R. D. (1995), *J Acoust Soc Am*, 98, 1858-1865. Generally speaking, the duration of an acoustic stimulus will be practically limited by the feasibility of having a subject remain still for a long time. Thus, in some applications the duration may need to be restricted to present the desired number of acoustic stimuli in a reasonable amount of time for a particular subject. In various embodiments, the duration may be about 10 msec, about 20 msec, about 30 msec, about 40 msec, about 50 msec, about 60 msec, about 70 msec, about 80 msec, about 90 msec, about 100 msec, or more.

When an acoustic stimulus has a complex sound that is a speech syllable, one strategy to limit duration is to use a consonant and a consonant-vowel ("CV") transition without a steady-state vowel. See, for example, Russo et al. (2004), *Clin Neurophysiol*, 115, 2021-2030; Johnson, et al. (2007), *J Cogn Neurosci*, 19, 376-385; Johnson, et al. (2008), *J Neurosci*, 28, 4000-4007; Hornickel, et al. (2009), *Audiol Neurootol*, 14, 198-207; Banai, et al. (2009), *Cereb Cortex*, 19, 2699-2707; Dhar, et al. (2009), *Clin Neurophysiol*, 120, 959-966. Because each consonant-to-vowel transition has a unique formant transition, the steady-state vowel can be removed with little impact on the percept. Within this disclosure, speech syllables with a consonant-to-vowel transition are identified by the consonant and the vowel, e.g., /da/, but this nomenclature is understood to include both a consonant and a consonant-vowel ("CV") transition without a steady-state vowel.

In some example embodiments, a complex sound includes one or more of an environmental sound, a musical sound, a speech sound, and a non-speech vocal sound. The complex sound has a fundamental frequency ($F_0$) that ranges from about 50 Hz to about 500 Hz, and duration of at least about 10 msec. In certain embodiments, the fundamental frequency ranges from about 80 Hz to about 300 Hz and/or the duration may be at least about 20 msec, at least about 30 msec, or at least about 40 msec. In certain embodiments, the fundamental frequency ranges from about 130 Hz to about 350 Hz and/or the duration may be at least about 20 msec, at least about 30 msec, or at least about 40 msec. In certain embodiments, the fundamental frequency ranges from about 180 Hz to about 400 Hz and/or the duration may be at least about 20 msec, at least about 30 msec, or at least about 40 msec. In certain embodiments, the fundamental frequency ranges from about 230 Hz to about 450 Hz and/or the duration may be at least about 20 msec, at least about 30 msec, or at least about 40 msec. In certain embodiments, the fundamental frequency ranges from about 280 Hz to about 500 Hz and/or the duration may be at least about 20 msec, at least about 30 msec, or at least about 40 msec.

In other example embodiments, a complex sound comprises a speech sound or a non-speech vocal sound. In other example embodiments, a complex sound consists of a speech sound or a non-speech vocal sound. The complex sound has a fundamental frequency ($F_0$) that ranges from about 50 Hz to about 500 Hz, and duration of at least about 10 msec. In certain embodiments, the fundamental frequency ranges from about 80 Hz to about 300 Hz and/or the duration may be at least about 20 msec, at least about 30 msec, or at least about 40 msec. In certain embodiments, the speech sound is speech syllable.

In another example embodiment, a complex sound has a duration of at least about 10 msec and comprises a first sound that transitions directly to a second sound, wherein the first sound has an attack substantially similar to an obstruent consonant and the second sound has a minimum of two formants held steady for one period of $F_0$ and $F_0$ ranges from about 50 Hz to about 500 Hz. In some embodiments the complex sound is a musical sound. In other embodiments the complex sound is an environmental sound. In other embodiments the complex sound is vocal sound.

In another example embodiment, a complex sound comprises a speech syllable, the speech syllable comprising a consonant-vowel transition, a diphthong, a triphthong, or a linguistic pitch contour. The complex sound may or may not be a word. The complex sound has a fundamental frequency ($F_0$) that ranges from about 50 Hz to about 500 Hz, and duration of at least about 10 msec. In certain embodiments, the fundamental frequency ranges from about 80 Hz to about 300 Hz and/or the duration may be at least about 20 msec, at least about 30 msec, or at least about 40 msec.

In another example embodiment, a complex sound consists of a speech syllable, the speech syllable comprising a consonant-vowel transition, a diphthong, or a linguistic pitch contour. The complex sound has a fundamental frequency ($F_0$) that ranges from about 50 Hz to about 500 Hz, and duration of at least about 10 msec. In certain embodiments, the fundamental frequency ranges from about 80 Hz to about 300 Hz and/or the duration may be at least about 20 msec, at least about 30 msec, or at least about 40 msec.

In other example embodiments, a complex sound comprises a consonant, a consonant-to-vowel transition, and optionally a vowel. The complex sound may or may not be a word. The complex sound has a fundamental frequency ($F_0$) that ranges from about 50 Hz to about 500 Hz, and duration of at least about 10 msec. In certain embodiments, the fundamental frequency ranges from about 80 Hz to about 300 Hz and/or the duration may be at least about 20 msec, at least about 30 msec, or at least about 40 msec. Non-limiting examples include /da/, /po/, /chu/, /ki/, /yi/, and /mi/, and variations thereof where the consonants and vowels are substituted for other consonants and vowels that produce similar acoustic features.

In other example embodiments, a complex sound consists of a consonant, a consonant-to-vowel transition, and optionally a vowel. The complex sound has a fundamental frequency ($F_0$) that ranges from about 50 Hz to about 500 Hz, and duration of at least about 10 msec. In certain embodiments, the fundamental frequency ranges from about 80 Hz to about 300 Hz and/or the duration may be at least about 20 msec, at least about 30 msec, or at least about 40 msec. Non-limiting examples include /da/, /po/, /chu/, /ki/, /yi/, and /mi/, and variations thereof where the consonants and vowels are substituted for other consonants and vowels that produce similar acoustic features.

In another example embodiment, a complex sound has a duration of at least about 10 msec and comprises a first sound that transitions directly to a second sound, wherein the first sound is an obstruent consonant and the second sound has a minimum of two formants held steady for one period of $F_0$ and $F_0$ ranges from about 50 Hz to about 500 Hz.

In another example embodiment, a complex sound has a duration of at least about 10 msec and consists of a first sound that transitions directly to a second sound, wherein the first sound is an obstruent consonant and the second sound has a minimum of two formants held steady for one period of $F_0$ and $F_0$ ranges from about 50 Hz to about 500 Hz.

In other example embodiments, a complex sound comprises a consonant, a consonant-to-vowel transition, and optionally a vowel, wherein the consonant is an obstruent stop consonant and the vowel is a low back vowel. A non-limiting example of this complex sound is /da/. The complex sound may or may not be a word. The complex sound has a fundamental frequency ($F_0$) that ranges from about 50 Hz to about 500 Hz, and duration of at least about 10 msec. In certain embodiments, the fundamental frequency ranges from about 80 Hz to about 300 Hz and/or the duration may be at least about 20 msec, at least about 30 msec, or at least about 40 msec.

In other example embodiments, a complex sound consists of a consonant, a consonant-to-vowel transition, and optionally a vowel, wherein the consonant is an obstruent stop consonant and the vowel is a low back vowel. A non-limiting example of this complex sound is /da/. The complex sound has a fundamental frequency ($F_0$) that ranges from about 50 Hz to about 500 Hz, and duration of at least about 10 msec. In certain embodiments, the fundamental frequency ranges from about 80 Hz to about 300 Hz and/or the duration may be at least about 20 msec, at least about 30 msec, or at least about 40 msec.

In other example embodiments, a complex sound comprises a speech syllable selected from the group consisting of /da/, /pa/, /ka/, /ta/, /ba/, and /ga/. The complex sound may or may not be a word. The complex sound has a duration of at least about 10 msec. In certain embodiments, the duration may be at least about 20 msec, at least about 30 msec, or at least about 40 msec.

In other example embodiments, a complex sound consists of a speech syllable selected from the group consisting of /da/, /pa/, /ka/, /ta/, /ba/, and /ga/. The complex sound has a duration of at least about 10 msec. In certain embodiments, the duration may be at least about 20 msec, at least about 30 msec, or at least about 40 msec.

To elicit a brain response, an acoustic stimulus is created and then presented to a subject. Natural sounds are recorded and then presented, and artificial sounds are synthesized and then presented. Various aspects of presentation including stimulus intensity, monoaural and binaural stimulation, left and right ear stimulation, stimulus polarity, stimulation rate, transducers, jitter in the stimulus presentation, and multiple stimulus conditions are standard in the art. See, for example, Skoe et al., *Ear & Hearing*, 2010, 31(3) and the references disclosed therein. Example description of generating a stimulus can also be found in U.S. Pat. Nos. 8,014,853; 8,712,514; and 8,825,140, U.S. Ser. Nos. 15/001,674, and 15/423,910, co-owned by the present applicant, each of which is herein incorporated by reference in its entirety.

Sound evokes a precise neural response in a subject's brain. In the present disclosure, a brain's response is measured using electrodes that pick up electrical potentials generated by populations of neurons in the brain. The terms "brain response" or "brain response data" can refer to a recorded measurement of the electrical potentials (e.g., voltage potentials) evoked in a subject's brain by an acoustic stimulus (e.g., an acoustic stimulus that includes a complex sound).

Various aspects relating to electrode placement, sampling rate, filtering, signal averaging and minimizing artifacts can be optimized through routine experimentation. For further detail, see for example, Skoe et al., *Ear & Hearing*, 2010, 31(3) and the references disclosed therein, as well as U.S.

Pat. Nos. 8,014,853; 8,712,514; and 8,825,140, and U.S. Ser. No. 15/001,674, each of which is hereby incorporated by reference in its entirety.

Generally speaking, a brain response is composed of a plurality of positive and negative amplitude deflections, referred to as "response peaks." A brain response can be initially recorded as a series of voltages over time (referred to as the time domain response), which can be converted to a series of voltages over frequency by methods well-known in the art (referred to as the frequency, or spectral, domain response). A brain response to complex sound can contain multiple, independent, components in both the time domain and the frequency domain. In the context of evaluating and/or monitoring CNS health in a subject with HIV, measurements of these components can be meaningful individually or in aggregate.

In the time domain, response peaks are generally classified as either a transient response peak or a sustained response peak. Similarly, regions of the time domain containing transient response peaks or sustained response peaks may be classified as a transient region or a sustained region, respectively. This terminology reflects a brain response to either a transient feature or a sustained feature of a complex sound. The number and morphology of peaks in a brain response varies based on the complex sound used.

All sounds generate a response peak corresponding to the onset of the sound (i.e., an onset peak), though there is typically a lag of about 6 to about 10 msec between when a sound begins and the onset peak. In some instances, a brain response to the onset of sound is a biphasic peak (e.g., positive then negative or negative then positive), rather than a single peak. The positive/negative pair may be referred to as an "onset response." The lag of about 6 msec to about 10 msec between the onset of sound and an onset peak is referred to as a "neural transmission delay" or a "neural onset delay."

An onset peak is a transient response. Additional transient responses may also be present including, but not limited to, a brain response to the onset of an amplitude burst and a brain response to the offset of sound. Complex sounds also generate response peaks that are time-locked to the temporal structure of the eliciting sound. These response peaks are sustained features of a brain response and reflect synchronous, population-wide neural phase locking. In embodiments where an acoustic stimulus includes an interstimulus interval, the brain response will contain an interstimulus region.

The response peaks for complex sounds routinely used in the art are well-known. For example, a 40 msec /da/ syllable produces six stereotyped peaks: peak V, which is a positive amplitude deflection corresponding to the onset of the stimulus and occurring about 6 msec to about 10 msec after stimulus onset; peak A, which is a negative amplitude deflection immediately following peak A; peaks D, E, and F, which are negative amplitude deflections corresponding to the voicing of the speech sound and occurring at about 22 msec, about 32 msec, and about 42 msec respectively; and peak O, which is a negative amplitude deflection following the offset of the sound, occurring at about 50 msec. A 170 msec /da/ syllable is described in White-Schwoch et al. *Hearing Research* 2015, 325:34-47, and descriptions of /ba/ and /ga/ sounds may be found in Johnson et al. *Clinical Neuropsychology* 119:2623-2635. The above description is not limiting. Additional references are known in the art for other complex sounds. If a complex sound is novel, one of skill in the art can characterize the response by methods known in the art.

Neural phase-locking is also evident in the frequency domain, where the brain response follows the periodicity of the eliciting sound. As such, the fundamental frequency and harmonics (i.e., integer multiples of $F_0$) of the eliciting sound are reflected in the brain response. Typically, all harmonics present in an acoustic stimulus, up to the frequency limits that the brain is able to produce, are present in a brain response. Though, generally speaking, phase-locking is more robust when there is less spectral flux (i.e., change in harmonics over time). Non-linearities of the auditory system will often result in additional harmonic peaks in the response beyond those present in the stimulus.

When an acoustic stimulus contains a speech sound or a non-speech vocal sound, certain harmonics are of particular importance phonetically. These harmonics are called "formants." Formants are harmonics that are larger in amplitude than surrounding harmonics (both in the eliciting sound and the response). Each speech sound can be uniquely identified by its characteristic formant pattern, with the first two or three formants being sufficient for identifying most speech sounds. For example, the /a/ sound will typically have a local peak at around 700-750 Hz regardless of the pitch ($F_0$) of the utterance. This is the first formant of /a/. The vowel /i/, on the other hand will typically have a first formant in the 250-300 Hz range.

In contrast to speech, which is dominated by fast spectrotemporal transitions, music has more prevailing temporal and spectral elements, slower transitions, and finer frequency spacing. In the same way that speech sounds are characterized by unique formant configurations, instruments also have characteristic harmonic structures that impart timbre. Specifically, the timbre of a musical sound is determined by the rise time of the attack, the spectral flux, and the spectral centroid (i.e., the distribution of the harmonics). The clarinet, for example, has a harmonic structure dominated by lower frequency odd harmonics (the even harmonics have been attenuated). The flute, saxophone, trombone, and tuba, which are all characterized by strong odd and even harmonics, can be differentiated by the distribution of the harmonics (e.g., the energy of the tuba is concentrated in the lower harmonics)

The spectral and temporal components of a brain response to complex sound have been described in detail elsewhere, as have methods to measure them. See, for example, Skoe et al., *Ear & Hearing,* 2010, 31(3) and the references disclosed therein. Certain aspects are described below.

One aspect of a brain response to a complex sound is the extent to which the brain response reflects the fundamental frequency of the stimulus. The fundamental frequency ($F_0$) is a defined parameter based on the acoustics of the eliciting sound. Various aspects of $F_0$ may be analyzed including but not limited to, $F_0$ amplitude, $F_0$ sharpness, $F_0$ phase consistency, or pitch tracking.

To calculate response $F_0$, the time domain response can be converted to a frequency domain response. Suitable methods for achieving this include, but are not limited to, fast Fourier transformation ("FFT"). The FFT may be computed on all or a portion of the time range collected. The time range over which the FFT is calculated may vary provided the range accounts for a neural transmission delay, which is typically about 6-10 msec, or may alternatively be determined by the timing of the first amplitude deflection in the brain response; does not extend beyond the end of the brain response, which is typically about 6-10 msec longer than the length of the stimulus plus onset delay; and includes one cycle of the period of the complex sound's $F_0$.

As a non-limiting example, at least a 10 msec time period is used to calculate the FFT for a complex sound with an $F_0$ of 100 Hz (i.e., because period is the inverse of frequency). The FFT may be generated using any standard windowing approach known in the art including, but not limited to, a Hanning window, a Hamming window, a Blackman window, a cosine window, a Nuttall window, a Blackman-Harris window, and a flat-top window, etc. The length of the ramp in computing the FFT can range from 1 msec up to half the length of the time window over which the FFT is calculated. For example, if the FFT is calculated over a 100 msec window, ramp times could include 1 msec, 2 msec, 3 msec, 4 msec, 5 msec, and so on up to 50 msec. The arithmetic mean of the amplitude of the spectrum that corresponds to the $F_0$ of the complex sound can also be calculated.

A response $F_0$ may be then determined, such as by using an autocorrelation method. An autocorrelation method time-shifts a waveform (A) with respect to a copy of itself (A') and correlates A to A' at many such time shifts. For example A(1:10) (i.e., points 1 to 10 of waveform A), is correlated to A'(1:10), then A(1:10) is correlated to A'(2:11), then A'(3:12), etc. The reverse shift also is evaluated, such at A(1:10) is correlated with A'(−1:9) and A'(−2:8) etc. Each time shift is considered a "lag," such that A(1:10) vs A'(1:10) has a lag of 0. A(1:10) vs A'(2:11) has a lag of 1, etc. The fundamental frequency of the waveform, A, will occur at $1/L_{max}$ Hz, where $L_{max}$ is defined as the lag (in sec) at which the maximum correlation is achieved. The definition of $L_{max}$ is further refined to exclude a lag of zero, which will always be the largest correlation.

In practice, if there is a known frequency range of interest, it is possible to restrict the search for the maximum correlation to lags that encompass the range of interest. For example, if a stimulus has a known $F_0$ of 100 Hz, the frequency range that is sought in the response can be restricted to a range of 80 to 120 Hz. In this case, the maximal correlation would be looked for in a lag range of 1/80 sec to 1/120 sec (8.33 msec to 12.5 msec). If a peak occurs at a lag of 9.7 msec, it could be concluded that the response had an $F_0$ of about 103 Hz. Determining $F_0$ by an autocorrelation method is particularly useful when the $F_0$ of the acoustic stimulus or brain response is not known a priori, when the $F_0$ of the acoustic stimulus is known but one desires to determine at what frequency the response occurred, when an acoustic stimulus is missing a fundamental type (e.g. the base frequency), or when a stimulus with a known $F_0$ produces a response peak at a slightly different frequency.

Information known about the stimulus $F_0$ may also be used to choose a suitable frequency window for evaluating one or more aspects of $F_0$. Different frequency regions of the spectrum will be analyzed based on the eliciting sound. In embodiments where the $F_0$ of the complex sound is static, the region may range from one-half the frequency of the eliciting sound $F_0$ (minimum of the region) to twice the frequency of the eliciting sound $F_0$ (maximum of the region). For example, for a complex sound with a 100 Hz $F_0$, the region of interest would be 50-200 Hz. Alternatively, a frequency window as small as 1 Hz may be selected. In embodiments where $F_0$ of the complex sound varied, the parameters for selecting the $F_0$ analyses of the brain response may be determined by the arithmetic mean $F_0$ of the stimulus or the upper and lower bounds. For example, if the complex sound $F_0$ changed from 100-150 Hz, the lower bound frequency region of interest could extend as low as 50 Hz and the upper bound as high as 300 Hz.

One aspect of a response $F_0$ is the amplitude. Amplitude may be calculated over a frequency region that is about 1 Hz, or the frequency region may be a range greater than 1 Hz. Any suitable method for quantifying $F_0$ amplitude may be used including, but not limited to the arithmetic mean amplitude over a region, the amplitude at a single frequency point, the total amplitude over a region of interest (summed, integer, root-mean-squared amplitude), and the signal-to-noise ratio of the $F_0$ (i.e., amplitude of $F_0$ versus amplitude of a neighboring frequency or amplitude of interstimulus region: for example, if $F_0$ is 100 Hz, then a signal-to-noise-ratio may be $Amplitude_{100\ Hz}/Amplitude_{90\ Hz}$ or $Amplitude_{100\ Hz}/Amplitude_{interstimulus}$). A comparison of the response $F_0$ amplitude to the eliciting sound $F_0$ amplitude (calculated in the same manner) can then be made.

Another aspect of $F_0$ is phase consistency. Phase consistency is a measure of timing variability of individual frequencies in a response. Phase consistency may also be referred to as phase locking or phase-locking factor. Phase consistency may be calculated over a frequency region that is about 1 Hz, or the frequency region may be range greater than 1 Hz.

To calculate phase consistency, first a spectrum can be calculated over a discrete time period of the response using an FFT. This results in a vector that contains a length, indicating the encoding strength of each frequency, and a phase, which contains information about the timing of the response to that frequency. To examine the timing variability of the response, each vector is transformed into a unit vector by dividing the FFT by the absolute value of the FFT. This transformation sets the length component of the vector to one, thereby discarding the information about encoding strength but maintaining the phase information. The resultant vector is generated for each response trial and then averaged across trials so that the length of the resulting vector provides a measure of the inter-trial phase consistency. It is acceptable to not use every trial. For example, artifact rejecting, or using other criteria, can result in phase consistency being calculated on a subset of the sweeps. Additionally or alternatively, some number of trials may be averaged prior to calculating phase consistency (e.g., averaging together every 10 trials), and/or the trials may be first filtered (provided the filters do not exclude the frequency bands of interest). Phase consistency can also be calculated using a bootstrapping method, in which a subset of the trials are selected at random, phase consistency is calculated across that subset of trials, those trials are replaced, and the process is repeated for a given number of times.

Instead of, or in addition to, determining the phase of the signal at a given time-frequency point, as described above, this approach could be used to extract the frequency of a signal at said point or points. Also, in addition to looking at phase consistency over a single time period in the response, a sliding window analysis can be used to calculate phase consistency over small, overlapping time periods of the response (e.g., a 40 msec window with a 39 msec overlap would result in phase consistency being calculated from 0-40 msec, 1-41 msec, 2-42 msec, etc.).

Other signal processing approaches to determine the instantaneous phase of the signal at specific frequencies are also known in the art including, but not limited to wavelets. Wavelets can be convolved with the brain response signal to provide amplitude and phase information for each time-frequency point(s). These could include Morlet wavelets, Mexican hat wavelets, Meyer wavelets, and so on.

Another aspect of a response $F_0$ is the $F_0$ frequency error, which can be defined as the difference in frequency (Hz)

between the $F_0$ of the complex sound and the maximum spectral peak in the region of interest in the response. For example, if the largest peak of the response from 75-175 Hz was at 125 Hz, and the stimulus $F_0$ was 100 Hz, then the $F_0$ frequency error would be +25 Hz.

Another aspect of a response $F_0$ is $F_0$ sharpness. $F_0$ sharpness may also be referred to as Fa bandwidth. To determine $F_0$ sharpness, the $F_0$ peak in the brain response spectrum can be identified. The width of the corresponding peak is then selected based on determining the difference between the surrounding ends of that peak at a pre-specified amplitude below that peak, such as 3 dB below the peak, 10 dB below the peak, or the entire length below the peak. The frequency difference between these two boundaries are determined and the ratio between the frequency difference and the pre-specified amplitude is determined, called the Q. For example, the Q of a peak at 100 Hz, with the bandwidth 10 dB below it, would be 10 (100/10). Bandwidth may be determined for peaks other than $F_0$, as well.

Another aspect of a response $F_0$ is pitch tracking. Pitch tracking refers to the extent to which a brain response tracks an $F_0$ that changes over time (e.g., a complex sound may have a linear increase in $F_0$ from 100 to 150 Hz over the duration of the sound). The idea is that at any given point in the stimulus, the $F_0$ is at a given instantaneous frequency. As an example, perhaps at time 20 msec the instantaneous frequency is 100 Hz; at 70 msec it is 125 Hz; and at 120 msec it is at 150 Hz. To determine these instantaneous frequencies (either in the stimulus or the response) an autocorrelation approach could be applied to small, overlapping segments of the waveform.

For example, to determine the instantaneous frequency at 20 msec, a segment of the waveform from 0 to 40 msec can be extracted and an autocorrelation technique can be applied, as described above. The resultant derived fundamental frequency ($1/L_{max}$) would be assigned to time 20 msec. Then, this could be repeated with a segment of the waveform from 1 to 41 msec. The resultant derived fundamental frequency ($1/L_{max}$) would be assigned to time 21 msec, etc. In this way, a pitch tracking analysis can be achieved, utilizing the "frequency error" method described above. The difference in frequency (Hz) between the $F_0$ of the stimulus and $F_0$ of the response could be computed for each time point, and the absolute values of the resulting frequency errors could be summed to compute an overall frequency error score, where a score of 0 indicates perfect pitch tracking and larger numbers indicate poorer pitch tracking.

Another aspect of a brain response to a complex sound is the extent to which a brain response reflects the harmonics of the acoustic stimulus. Various aspects may be analyzed including, but not limited to, harmonic amplitude, phase consistency, spectral flux, and spectral centroid.

Suitable methods for analyzing various aspects of the response harmonics are well-known in the art. These methods include those described for $F_0$, changing parameters as needed to reflect the frequency range of the harmonics. For example, when determining phase consistency of the harmonics, frequency information outside of the $F_0$ is analyzed. This region may be as small as 1 Hz, or it may encompass a range of harmonics. Amplitudes at individual harmonics may also be averaged together. In another example, when creating an average of the response in embodiments where the acoustic stimulus was presented to a subject in multiple polarities (e.g., condensation and rarefaction) then, the responses to one of the polarities can be inverted before averaging (i.e., "subtracted") in order to enhance the response to the harmonics. Additionally or alternatively, harmonic amplitude may be referenced to the amplitude of a non-stimulus-evoked portion of the response. An example of a non-stimulus-evoked portion of the response would be the interstimulus period, in other words the response to the silence between successive stimulus presentations. This interstimulus-period response would be considered background activity of the brain, and so computing the ratio, for example, $RMS_{harmonic}/RMS_{interstimulus}$ would be considered a signal to noise ratio (SNR).

Another aspect of a brain response to a complex sound is the speed or timing of one or more response peaks of the brain response. The identity and number of response peaks analyzed can vary depending on the acoustic stimulus. For example, while all complex sounds elicit an onset peak, not all features are shared by every complex sound.

In some embodiments, one or more transient features are analyzed. In other embodiments one or more sustained features are evaluated. In other embodiments one or more transient features and/or one or more sustained features are evaluated. In each of the above embodiments, as few as one response peak may be analyzed or more than one response peak may be analyzed. When analyzing more than one response peak, the response peaks may or may not be clustered in the same time region.

As a non-limiting example, if the complex sound was a /da/ sound, a subset of peaks in the response time region corresponding to just the /d/ may be analyzed (accounting for the neural onset delay). Additionally or alternatively, the onset peak could be analyzed and/or the consonant-to-vowel transition (or just a portion thereof) could be analyzed. As another example, when a complex sound has a longer duration and encompasses multiple, discrete features (e.g., complex speech sounds containing multiple phonemes or syllables, or a complex sound that is a musical melody or containing several musical notes), it might be logical, in these cases, to perform an analysis over discrete acoustic/phonetic portions of the complex sound and response.

Methods for identifying response peaks are well-known in the art, aspects of which are briefly described in the present disclosure. See, for example, Skoe et al., *Ear & Hearing*, 2010, 31(3) and the references disclosed therein.

In one approach, the locations of the stereotyped peaks in a brain response may be determined by the individual who collected the data. The method typically involves the use of two or more subaverages generated by a computer to identify where the peaks in a subject's brain response reliably occur. The peaks are then marked on the final averaged waveform. Alternatively, a normative database may be used in addition to or instead of subaverages. For example, a table listing expected peaks and typical latency ranges for each peak could be consulted. In additional examples, a "norm" response that is the average of all of the individuals in a normative database could be used, or a subject's previous response that already has marked peaks could be used. In yet another example, an algorithm may be used to identify local minima and maxima within a predetermined window. For example, a computer could detect the timing of the largest amplitude point within a pre-specified window (e.g., about 6 to 10 msec for an onset peak). A computer program could use other signal processing approaches to identify these peaks, such as a principal components analysis to identify a peak-to-trough complex in the response. Using the /da/ syllable for illustration, a computer program could identify V and A based on their shape and statistical modeling of the response versus a norm. Alternatively still, a hybrid method of the above approaches may be used. For example, an algorithm may initially identify peaks and an individual adjusts them, or vice-versa.

An alternative approach to determine neural timing may use a stimulus-response cross-correlation approach, for example as described in the present disclosure. Instead of a correlation value, the timing shift that achieves the maximum correlation is used to quantify neural timing ($L_{max}$=neural timing).

A third approach to determine neural timing may involve calculating the phase delay, also known as the group delay of the response. The group delay calculates the timing of constituent sinusoids in a complex signal, and so provides a frequency-specific measure of timing. It is the rate of change of transmission phase angles of the frequencies in the signal. It is calculated as the negative first derivative of the phase response of a signal:

$$\tau_g(w) = -\frac{d\phi(w)}{dw};\quad(1)$$

where $\tau_g$ (w) is the group delay, $\phi$ is the phase difference between the signal and response, and w is the frequency. This can be computed across all frequencies ($\tau_g(w)$) or for individual frequencies in the response ($\tau_g(\phi)$). These frequency ranges of interest could be determined based on the criteria discussed under $F_0$ or harmonics.

Another aspect of a brain response to a complex sound is the amplitude of one or more response peaks of the brain response. This aspect is conceptually similar to $F_0$ amplitude; however, $F_0$ is a frequency domain measurement and response peaks are time domain measurements. In some embodiments, one or more transient features are analyzed. In other embodiments one or more sustained features are evaluated. In other embodiments one or more transient features and/or one or more sustained features are evaluated. In each of the above embodiments, as few as one response peak may be analyzed or more than one response peak may be analyzed. When analyzing more than one response peak, the response peaks may or may not be clustered in the same time region.

As a non-limiting example, if the complex sound was a /da/, a subset of peaks in the response time region corresponding to just the /d/ may be analyzed (accounting for the neural onset delay). Additionally or alternatively, the onset peak could be analyzed and/or the consonant-to-vowel transition (or just a portion thereof) could be analyzed. As another example, when a complex sound has a longer duration and encompasses multiple, discrete features (e.g., complex speech sounds containing multiple phonemes or syllables, or a complex sound that is musical melody or contains several musical notes), it might be logical, in these cases, to perform an analysis over discrete acoustic/phonetic portions of the complex sound and response.

Methods for identifying response peaks, and regions of peaks, are discussed above. Computational methods suitable for determining a response amplitude for an individual peak or a region containing multiple peaks are known in the art and include, but are not limited to, arithmetic mean amplitude over a region, the root-mean-squared ("RMS") amplitude of the peak or region, mean amplitude of the points, max point minus min point (i.e., peak-to-peak maximum), sum of the points in the rectified waveform, amplitude at a single frequency point, the total amplitude over a region of interest (summed, integer, root-mean-squared amplitude), etc.

In certain embodiments, the amplitude of a response peak may be referenced to the amplitude of a non-stimulus-evoked portion of the response. An example of a non-stimulus-evoked portion of the response would be the interstimulus period, in other words the response to the silence between successive stimulus presentations. This interstimulus-period response would be considered background activity of the brain, and so computing the ratio $RMS_{response}/RMS_{interstimulus}$ would be considered a signal-to-noise ratio ("SNR"). If desired, an SNR may be expressed in decibels (dB) by taking the 10-base log of the RMS amplitude ratio and multiplying by 20.

A comparison of a response peak amplitude to the eliciting sound response peak amplitude (calculated in the same manner) can then be made.

Another aspect of a brain response to a complex sound is the extent to which the response resembles the evoking sound. Stimulus-response correlations may be performed in the time domain or the frequency domain.

To determine stimulus-response correlation in the time, an acoustic stimulus may be filtered across a bandwidth to match the response and each subject's response may be cross-correlated to the filtered stimulus. Other suitable methods known in the art may also be used.

The type of filter may vary (e.g., Butterworth, Chebyshev, elliptic, Kaiser, etc.), as may the order (e.g., first-order, second-order, etc.) which is also known as the number of poles. The higher the order, the less energy is present outside the specified filter bandwidth.

The bandwidth across which the filter is applied may vary. Generally speaking, an acoustic stimulus will have higher frequency content than an FFR from the brain. Therefore, low-pass filtering of the acoustic stimulus will result in a stimulus waveform that correlates better with the FFR. To select the low-pass filter cutoff, one approach is to match the bandwidth to that of the FFR recording's bandwidth. A second approach is to choose a low-pass filter that approaches the actual frequency content of the FFR. This approach might result in a low-pass filter of about 1000 Hz because typically an envelope-dominated FFR will have little energy above 1000 Hz. Likewise, the choice of high-pass filter may be matched to the FFR recording or may some other value that approximates the lowest frequency present in the FFR collection.

The time window selected for performing the cross-correlation may vary. In one approach, when the complex sound is a speech sound, a selected time window may correspond roughly to the fully-voiced portion of the stimulus. For example, the time window described in the examples for the /d/ stimulus omits the unvoiced consonant release and the transient FFR component corresponding to the onset of voicing. Other time windows, encompassing a voiced (i.e., periodic) response waveform might also be selected. For example, longer speech stimuli may encompass multiple phonemes or syllables. It might be logical, in these cases, to perform this analysis over discrete acoustic/phonetic portions of the stimulus and response. For example, just the voiced portion of a consonant transition. Or, just a steady-state vowel portion. Similar concepts apply to other complex sounds.

The cross-correlation function is a standard procedure that time-shifts one waveform (A) with respect to another (B) and correlates A to B at many such time shifts. For example A(1:10) (i.e., points 1 to 10 of waveform A) is correlated to B(1:10), then A(1:10) is correlated to B(2:11), then B(3:12), etc. The reverse shift also is evaluated, such at A(1:10) is correlated with B(−1:9) and B(−2:8) etc. Each time shift is considered a "lag," such that A(1:10) vs B(1:10) has a lag of 0. A(1:10) vs B(2:11) has a lag of 1, etc. Pearson product-moment correlation, point-biserial, or Spearman techniques may be used to create a correlation score. For example, the Pearson product-moment correlation produces an "r" score. This results in a value scaled from −1 to +1, with +1 meaning perfect correlation, −1 meaning perfect anti-correlation (i.e., identical, but fully out-of-phase), and 0 meaning complete lack of correlation. A type of correlation that produces values outside the −1 to +1 range might also be used.

In performing the cross-correlation, the time-shift (i.e., lag) that produces the maximum Pearson's r-value (or value produced by another method) is sought. However, there are logical constraints to the lag. For example, it is illogical that the brain response would occur before the stimulus. Therefore, negative lag values are not considered. Likewise, it is known that it takes about 6-10 msec for the auditory pathway to respond to a sound and to propagate the signal to the recording electrodes. Therefore a lag smaller than about 6 msec would likewise be illogical because it is simply not biologically possible. It is also known that it typically does not take longer than about 10-12 msec for a signal to arise. So, an "appropriate lag" is typically a range of about 6 to about 15 msec, or about 6 to about 12 msec. A slightly different lag would also be acceptable.

When performing parametric statistical analysis on Pearson's correlation data, it is a routine procedure to calculate a Fisher-transformed z-score. While not strictly necessary, statistical conclusions drawn from non-transformed data may be suspect. This is a mathematical, natural-log-based transformation that normalizes the r-distribution so that all delta-r values, along the −1 to +1 range are equivalently constant. That is, the variance of untransformed r-values that are toward the ends of the range (near −1 or near +1) is much smaller than the variance of r-values at the middle of the range (near 0).

All descriptions and alternatives described above involve time-domain comparisons between an acoustic stimulus and its evoked response. Correlations could also be performed between frequency-domain waveforms of the stimulus and response. The major difference, aside from the frequency-domain conversion itself, is that the allowance for the lag is typically made be made in the time domain prior to frequency-domain conversion and a straight (i.e., non-cross-) correlation can be performed. As a non-limiting example, assume that a frequency-domain correlation of neural activity to the 20-80 msec portion of a particular stimulus is desired. In this example, if a typical response, due neural propagation time, arises 8 msec after the stimulus, a frequency-domain conversion of the 20-80 msec segment of the stimulus and of the 28-88 msec segment of the response could be performed. Then, once in the frequency domain, a straight correlation (lag=0) could be performed.

Another aspect of a brain response to a complex sound is the extent to which every presentation of the same acoustic stimulus (each a "trial") results in the same brain response. This may also be referred to as the stability of response. Response-consistency calculations may be performed in the time domain or the frequency domain. In addition, response-consistency calculations may be performed on an added waveform (e.g., opposing-polarity stimulus presentations are added) or a subtracted waveform (e.g., opposing-polarity stimulus presentations results subtracted/the responses to one of the polarities can be inverted).

In one approach, approximately half of the trials are randomly selected and averaged, and the remaining trials are averaged. The two sub-averaged waveforms are then correlated over a time window to determine their similarity. The time window can vary, as described above for stimulus-response correlation. Suitable methods for calculating a correlation score are known in the art and include, but are not limited to Pearson product-moment correlation, point-biserial, or Spearman techniques; correlation data may be Fisher-transformed to a z-score before averaging. These steps are then repeated a number of different times, each repetition with a different random samplings of trials, and the correlation values from each repetition are averaged (e.g., arithmetic mean) to generate a final measure of inter-trial response consistency. The number of repetitions can vary, but should be selected to provide confidence that the final mean correlation value is a good representation of the underlying data. Another approach is not to maintain individual trials, but rather collect two discrete subaverages.

In certain embodiments, the amplitude of a response peak may be referenced to the amplitude of a non-stimulus-evoked portion of the response. An example of a non-stimulus-evoked portion of the response would be the interstimulus period, in other words the response to the silence between successive stimulus presentations. This interstimulus-period response would be considered background activity of the brain, and so computing the ratio response/interstimulus would be considered an SNR.

A difference measure is a means of quantifying a change in a measure. For example, a difference measure may provide a means of quantifying a change in a response component in the same subject after time has passed, or after injury or intervention has taken place. A difference measure is also a means to quantify a difference in the same response component(s) to two (or more) different stimuli in the same subject. Additionally or alternatively, a difference measure may be applied to two measures within a single response. For example, the timing difference between peaks V and A, the phase-locking ratio between the $F_0$ and one or more harmonics, the amplitude ratio between multiple harmonics, the RMS amplitude difference between added- and subtracted-polarity responses, etc.

Difference measures may be expressed as a percent change (e.g., increase or decrease), as absolute terms (e.g., delay in msec, decrease in magnitude in μV, increase in frequency error in Hz, decrease in response consistency in r, etc.), or as a dB difference.

In embodiments where an acoustic stimulus includes background noise, a difference measure may be a change in a response component in the presence of background noise as compared to the absence of background noise. For example, background noise is known to diminish response amplitudes, so one may wish to determine the percent reduction of $F_0$ amplitude when background noise is added to the acoustic stimulus. Any of the above listed measurements can be evaluated.

Examples of other contexts in which two or more responses could be compared include: changes in one or more frequencies in the sound (e.g., a /d/ with a high pitch versus a /d/ with a low pitch); different speech sounds (e.g., a /d/ compared to a /b/); sounds of varying amplitude modulation index, also known as modulation depth (e.g., the extent to which, in a complex signal, the ratio of the excursions of the modulated signal to the unmodulated signal, resulting in the degree of local amplitude envelope variation between two consecutive peaks in the signal); musical sounds of different pitch or timbre; etc.

Figure 6:
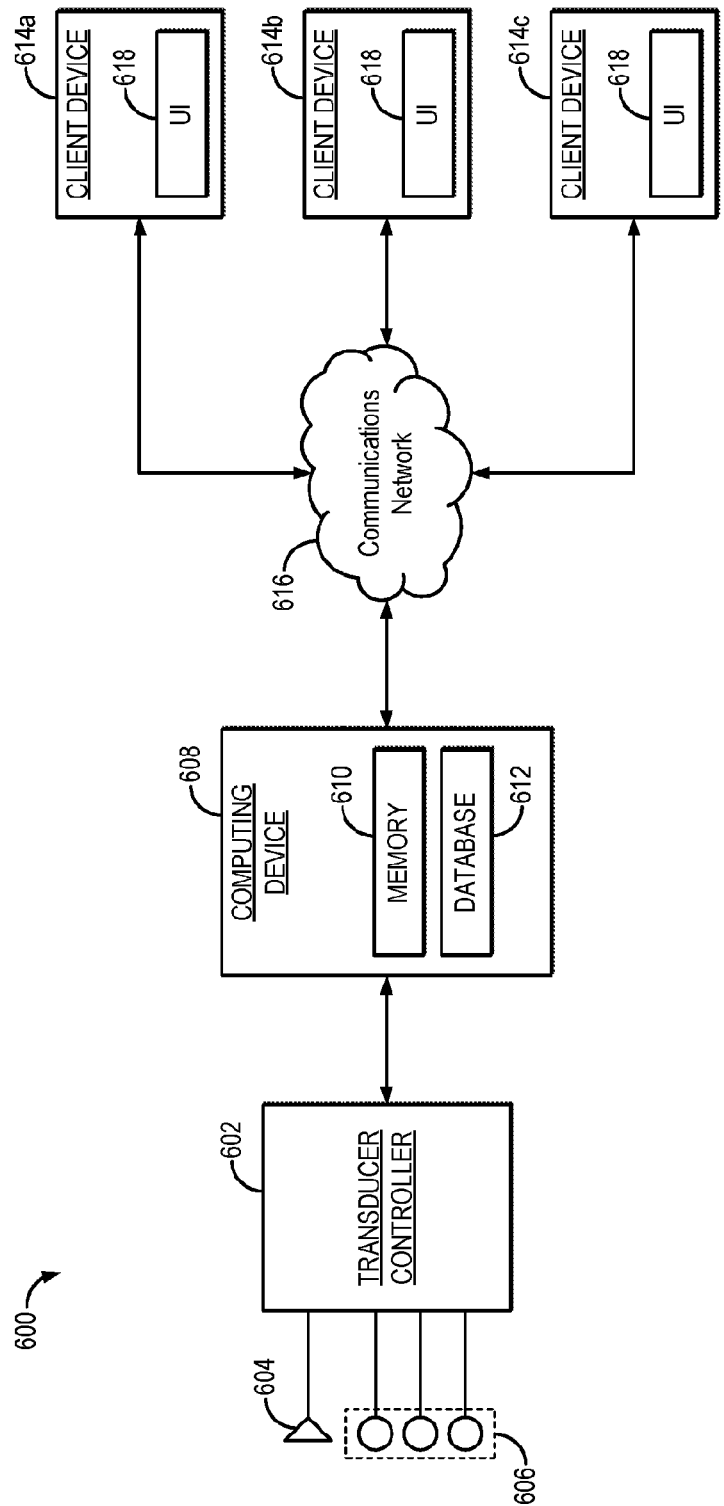
FIG. 6 is a block diagram of an example computing environment and/or computing system that can be implemented to transmit acoustic stimuli, receive and process brain response data, and generate indications of CNS health in subjects with HIV based on the brain response data.

FIG. 6 illustrates a computing environment and/or computing system 600 that automatically transmits acoustic stimuli, receives and processes brain response data, and automatically generates indications of CNS health in subjects with HIV based on the brain response data. More specifically, FIG. 6 illustrates a computing environment and/or computing system 600 including a computing device 608 operating in conjunction with various other hardware and/or software components that may be used to perform or otherwise execute the processes described with respect to FIG. 1, FIG. 2, and/or FIG. 3.

Referring initially to FIG. 6, the computing system 600 includes a transducer controller 602 functionally coupled to an acoustic transducer 604 and one or more electrodes 606. More specifically, the transducer controller 602 represents a computing and/or processing device that delivers a stimulus to the acoustic transducer 604. Additionally, the transducer controller 602 may receive and process brainwave signal information from the one or more electrodes 606. The transducer controller 602 may be any suitable stimulus delivery and data acquisition system, including PC-based stimulus delivery and data acquisition systems such as those available from Bio-logic Systems Corporation or Compumedics. The acoustic transducer 604 may be an insert earphone such as the ER-3 insert earphone available from Etymotic Research, Elk Grove, Ill. As one non-limiting example, the one or more electrodes 606 may be Ag—AgCl scalp electrodes, which may be positioned on the test subject from Cz (active) to ipsilateral earlobe (reference) with forehead ground.

The transducer controller 602 may be functionally connected to a computing device 608 including a memory 610 within which instructions are retained directing the operation of the computing device 608 for carrying out the herein described methods and processes (e.g., process 200 of FIG. 2 and process 300 of FIG. 3). More specifically, the computing device 608 automatically generates a test stimulus signal, communicates the test stimulus signal to the transducer controller 602 for generation of an acoustic stimulus that is presented or otherwise provided to the test subject via the acoustic transducer 604. The computing device 608 may obtain brain response data via the electrodes 606 and the transducer controller 602. The brain response data may be stored within the memory 610 and/or stored or otherwise maintained in a database 612.

The computing device 608 may transmit the brain response data to one or more client devices 614 (e.g., client devices 614a, 614b, 614c). The one or more client devices 614 functionally communicate with the computing device 608 through a communications network 616, which may be the Internet, an intranet, an Ethernet network, a wireline network, a wireless network, and/or another communication network. The one or more client devices 614 may be a personal computer, work station, mobile device, mobile phone, tablet device, processor, and/or other processing device capable of implementing and/or executing processes, software, applications, etc., that includes network-enabled devices and/or software, such as user-interface 618 for communication over the communications network 616 (e.g., browsing the Internet). Additionally, the one or more client devices 614 may include one or more processors that process software or other machine-readable instructions and may include a memory to store the software or other machine-readable instructions and data.

The database 612 may include one or more data structures used to stored data for analysis of the acquired brain response data. For example, the database 612 may contain one or more data structures containing normative response data to which the acquired brain response data may be compared to provide comparison data. The database 612 may further contain criteria data for evaluating the comparison data for qualifying or quantifying CNS health in a subject with HIV.

Figure 7:
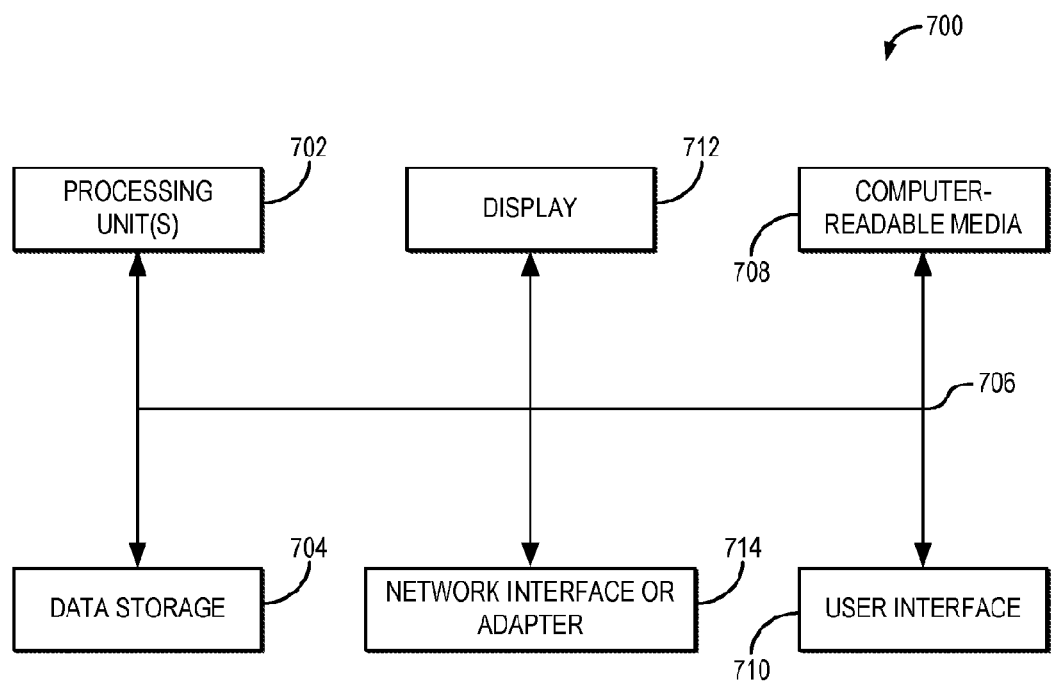
FIG. 7 is a block diagram of an example hardware components that can implement a computer system.

FIG. 7 illustrates an example of a suitable computing and networking environment that may be used to implement various aspects of the present disclosure (e.g., the computing device 608 and corresponding components). As illustrated, the computing and networking environment includes a general purpose computer 700, although it is contemplated that the computing and networking environment may include other computing systems, such as personal computers, server computers, hand-held or laptop devices, tablet devices, multiprocessor systems, microprocessor-based systems, set top boxes, programmable consumer electronic devices, network PCs, minicomputers, mainframe computers, digital signal processors, state machines, logic circuitries, distributed computing environments that include any of the above computing systems or devices, and the like.

Components of the computer 700 may include various hardware components, such as a processing unit 702, a data storage 704 (e.g., a system memory), and a system bus 706 that couples various system components of the computer 700 to the processing unit 702. The system bus 706 may be any of several types of bus structures including a memory bus or memory controller, a peripheral bus, and a local bus using any of a variety of bus architectures. For example, such architectures may include Industry Standard Architecture ("ISA") bus, Micro Channel Architecture ("MCA") bus, Enhanced ISA ("EISA") bus, Video Electronics Standards Association ("VESA") local bus, and Peripheral Component Interconnect ("PCI") bus also known as Mezzanine bus.

The computer 700 may further include a variety of computer-readable media 708 that includes removable/non-removable media and volatile/nonvolatile media, but excludes transitory propagated signals. Computer-readable media 708 may also include computer storage media and communication media. Computer storage media includes removable/non-removable media and volatile/nonvolatile media implemented in any method or technology for storage of information, such as computer-readable instructions, data structures, program modules or other data, such as RAM, ROM, EEPROM, flash memory or other memory technology, CD-ROM, digital versatile disks ("DVD") or other optical disk storage, magnetic cassettes, magnetic tape, magnetic disk storage or other magnetic storage devices, or any other medium that may be used to store the desired information/data and which may be accessed by the computer 900. Communication media includes computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. For example, communication media may include wired media such as a wired network or direct-wired connection and wireless media such as acoustic, RF, infrared, and/or other wireless media, or some combination thereof. Computer-readable media may be embodied as a computer program product, such as software stored on computer storage media.

The data storage or system memory 704 includes computer storage media in the form of volatile/nonvolatile memory such as read only memory ("ROM") and random access memory ("RAM"). A basic input/output system ("BIOS"), containing the basic routines that help to transfer information between elements within the computer 700 (e.g., during start-up) is typically stored in ROM. RAM typically contains data and/or program modules that are immediately accessible to and/or presently being operated on by processing unit 702. For example, in one embodiment, data storage 704 holds an operating system, application programs, and other program modules and program data.

Data storage 704 may also include other removable/non-removable, volatile/nonvolatile computer storage media. For example, data storage 704 may be: a hard disk drive that reads from or writes to non-removable, nonvolatile magnetic media; a magnetic disk drive that reads from or writes to a removable, nonvolatile magnetic disk; and/or an optical disk drive that reads from or writes to a removable, nonvolatile optical disk such as a CD-ROM or other optical media. Other removable/non-removable, volatile/nonvolatile computer storage media may include magnetic tape cassettes, flash memory cards, digital versatile disks, digital video tape, solid state RAM, solid state ROM, and the like. The drives and their associated computer storage media, described above and illustrated in FIG. 7, provide storage of computer-readable instructions, data structures, program modules and other data for the computer 700.

A user may enter commands and information through a user interface 710 or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs (e.g., via hands or fingers), or other natural user interfaces may also be used with the appropriate input devices, such as a microphone, camera, tablet, touch pad, glove, or other sensor. These and other input devices are often connected to the processing unit 702 through a user interface 710 that is coupled to the system bus 706, but may be connected by other interface and bus structures, such as a parallel port, game port or a universal serial bus ("USB"). A monitor 712 or other type of display device is also connected to the system bus 706 via an interface, such as a video interface. The monitor 712 may also be integrated with a touch-screen panel or the like.

The computer 700 may operate in a networked or cloud-computing environment using logical connections of a network interface or adapter 714 to one or more remote devices, such as a remote computer. The remote computer may be a personal computer, a server, a router, a network PC, a peer device or other common network node, and typically includes many or all of the elements described above relative to the computer 700. The logical connections depicted in FIG. 7 include one or more local area networks ("LAN") and one or more wide area networks ("WAN"), but may also include other networks. Such networking environments are commonplace in offices, enterprise-wide computer networks, intranets and the Internet.

When used in a networked or cloud-computing environment, the computer 700 may be connected to a public and/or private network through the network interface or adapter 714. In such embodiments, a modem or other means for establishing communications over the network is connected to the system bus 706 via the network interface or adapter 714 or other appropriate mechanism. A wireless networking component including an interface and antenna may be coupled through a suitable device such as an access point or peer computer to a network. In a networked environment, program modules depicted relative to the computer 700, or portions thereof, may be stored in the remote memory storage device.

The present disclosure has described one or more preferred embodiments, and it should be appreciated that many equivalents, alternatives, variations, and modifications, aside from those expressly stated, are possible and within the scope of the invention.

The invention claimed is:

1. A method for generating an indication of central nervous system (CNS) health in a subject who has an immunodeficiency virus, the method comprising:
   (a) administering an acoustic stimulus to the subject, wherein the acoustic stimulus includes a complex sound;
   (b) acquiring brain response data from the subject's brain while the acoustic stimulus is administered to the subject, wherein the brain response data are acquired by measuring voltage potentials in the subject's brain using one or more electrodes;
   (c) analyzing the brain response data with a computer system to extract a frequency following response (FFR) associated with the acoustic stimulus;
   (d) determining a component of the FFR using the computer system; and
   (e) generating the indication of CNS health of the subject who has the immunodeficiency virus based on the component of the FFR;
   wherein the component of the FFR is at least one of:
      a component of a first formant of the FFR:
      a component of a fundamental frequency of the FFR; or
      amplitude, frequency error, sharpness, phase consistency, pitch tracking, neural timing, brain response amplitude, stimulus-response correlation, response consistency, difference measures, and combinations thereof.

2. The method as recited in claim 1, wherein the component of the FFR is the component of the first formant of the FFR and the indication of CNS health of the subject is generated by comparing the component of the first formant of the FFR to normative data.

3. The method as recited in claim 2, wherein the indication of CNS health represents CNS dysfunction when comparing the component of the first formant of the FFR to the normative data indicates a decrease in the component.

4. The method as recited in claim 2, wherein the normative data comprise at least one component of an FFR measured from the subject at an earlier time.

5. The method as recited in claim 2, wherein the normative data comprise at least one component obtained from a healthy control subject.

6. The method as recited in claim 1, wherein the component of the FFR is the component of the fundamental frequency of the FFR and the indication of CNS health of the subject is generated by comparing the component of the fundamental frequency of the FFR to normative data.

7. The method as recited in claim 1, wherein the complex sound is a speech sound comprising a consonant and a consonant-to-vowel transition.

8. The method as recited in claim 7, wherein the component of the FFR is determined over a time window corresponding to some or all of one of the consonant or the consonant-to-vowel transition.

9. The method as recited in claim 7, wherein the speech sound further comprises a vowel.

10. The method as recited in claim 7, wherein the speech sound comprises a speech syllable including at least one of /da/, /ba/, and /ga/.

11. The method as recited in claim 1, wherein the acoustic stimulus comprises the complex sound and background noise.

12. The method as recited in claim 1, wherein the subject is a human subject who has human immunodeficiency virus (HIV).

13. The method as recited in claim 1, wherein the subject is a non-human subject who has an analog of human immunodeficiency virus.

14. The method as recited in claim 13, wherein the subject is a non-human simian who has simian immunodeficiency virus.

15. The method as recited in claim 13, wherein the subject is a feline subject who has feline immunodeficiency virus.

16. The method as recited in claim 1, wherein the subject is a non-human subject who has a non-human-species analog of human immunodeficiency virus (HIV).

17. The method as recited in claim 16, wherein the non-human-species analog of HIV comprises an animal model of HIV.

* * * * *